US012302887B2

(12) United States Patent
Burt et al.

(10) Patent No.: US 12,302,887 B2
(45) Date of Patent: May 20, 2025

(54) ARTHROPOD TRAPPING DEVICE

(71) Applicant: The Procter & Gamble Company, Cincinnati, OH (US)

(72) Inventors: Adam James Burt, Loveland, OH (US); Christopher Lawrence Smith, Liberty Township, OH (US); Travis Kyle Hodgdon, Cincinnati, OH (US); Erik John Hasenoehrl, Loveland, OH (US); Francez Yahiriz Curbelo Canabal, Naperville, IL (US)

(73) Assignee: The Procter & Gamble Company, Cincinnati, OH (US)

( * ) Notice: Subject to any disclaimer, the term of this patent is extended or adjusted under 35 U.S.C. 154(b) by 22 days.

(21) Appl. No.: 18/116,464

(22) Filed: Mar. 2, 2023

(65) Prior Publication Data

US 2023/0309540 A1 Oct. 5, 2023

Related U.S. Application Data

(60) Provisional application No. 63/315,940, filed on Mar. 2, 2022.

(51) Int. Cl.
*A01M 1/14* (2006.01)

(52) U.S. Cl.
CPC .................................. *A01M 1/145* (2013.01)

(58) Field of Classification Search
CPC A01M 1/10; A01M 1/04; A01M 1/08; A01M 1/16; A01M 1/145; A01M 1/2094; A01M 1/2061; A01M 1/106; A01M 1/24; A01M 1/023
USPC ........................................................... 43/113
See application file for complete search history.

(56) References Cited

U.S. PATENT DOCUMENTS

| | | | | | |
|---|---|---|---|---|---|
| 2,942,090 | A | | 6/1960 | Diehl | |
| 3,023,539 | A | * | 3/1962 | Emerson, Jr. | A01M 1/145 43/113 |
| 4,117,624 | A | * | 10/1978 | Phillips | A01M 1/145 43/113 |
| 4,212,129 | A | * | 7/1980 | Shumate | A01M 1/04 43/113 |
| 4,654,998 | A | | 4/1987 | Clay | |
| 4,686,789 | A | * | 8/1987 | Williams | A01M 1/145 43/113 |
| 4,876,822 | A | | 10/1989 | White | |

(Continued)

FOREIGN PATENT DOCUMENTS

| | | | |
|---|---|---|---|
| BR | 9400882 | A | 10/1995 |
| CN | 2093515 | U | 1/1992 |

(Continued)

OTHER PUBLICATIONS

Merged translation of EP_3269236 (Year: 2018).*

(Continued)

*Primary Examiner* — Morgan T Jordan
(74) *Attorney, Agent, or Firm* — Amanda Herman Berghauer

(57) ABSTRACT

The present disclosure relates generally to an arthropod trapping device, more particularly, to a compact and portable trapping device comprising a housing and an insert, where the insert is also attachable to or insertable into a handheld trapping implement.

10 Claims, 20 Drawing Sheets

100 302 150 152 300 302 126 300 114 114 112 102 122

(56) References Cited

U.S. PATENT DOCUMENTS 4,899,485 A * 2/1990 Schneidmiller ......... A01M 1/04 43/107
4,918,856 A * 4/1990 Olive .................... A01M 1/145 43/113
4,930,251 A * 6/1990 Crisanti .................. A01M 1/14 43/107
4,949,501 A * 8/1990 Larkin .................. A01M 1/145 43/113
4,951,414 A 8/1990 Mewissen
5,044,112 A 9/1991 Williams
5,142,815 A 9/1992 Birdsong
5,251,397 A 10/1993 Exum et al.
5,311,696 A * 5/1994 Gauthier ............. A01M 1/2016 43/113
5,311,697 A * 5/1994 Cavanaugh ............. A01M 1/08 43/132.1
5,335,445 A 8/1994 Kuepper
5,365,690 A 11/1994 Nelson et al.
D357,725 S 4/1995 Biasetti
5,513,465 A * 5/1996 Demarest .............. A01M 1/145 43/113
5,722,199 A * 3/1998 Demarest .............. A01M 1/145 43/113
5,915,948 A 6/1999 Kunze et al.
5,974,727 A 11/1999 Gilbert
6,108,965 A 8/2000 Burrows et al.
6,397,515 B1 6/2002 Brown et al.
6,478,440 B1 11/2002 Jaworski
6,493,986 B1 12/2002 Nelson et al.
6,560,919 B2 5/2003 Burrows
6,886,292 B2 5/2005 Studer
8,291,638 B2 10/2012 Larsen
8,316,578 B2 * 11/2012 Faham .................... A01M 1/14 43/107
8,572,890 B1 * 11/2013 Lark ..................... A01M 1/145 43/113
8,701,335 B2 4/2014 Larsen
8,707,614 B2 4/2014 Larsen
8,740,110 B2 * 6/2014 Gruenbacher .......... A61L 9/127 239/57
D736,341 S 8/2015 Lieberwirth et al.
D780,284 S 2/2017 Lieberwirth
D780,285 S 2/2017 Lieberwirth
D829,302 S 9/2018 Rocha et al.
D834,136 S 11/2018 Smith
D834,137 S 11/2018 Smith
10,143,191 B2 12/2018 Studer et al.
D845,430 S 4/2019 Smith
D849,878 S 5/2019 Lieberwirth
D850,572 S 6/2019 Lieberwirth
10,327,435 B2 6/2019 Studer et al.
D855,143 S 7/2019 Wang
10,561,135 B2 2/2020 Sandford
10,568,314 B2 2/2020 Sandford
D877,852 S 3/2020 Wang
D878,512 S 3/2020 Wang
10,588,307 B2 3/2020 Sandford
D890,291 S 7/2020 Rocha et al.
D926,918 S 8/2021 Lieberwirth et al.
D930,105 S 9/2021 Wang
D934,980 S 11/2021 Smith et al.
D934,981 S 11/2021 Wang et al.
D940,815 S 1/2022 Lieberwirth et al.
D959,593 S 8/2022 Smith
D963,103 S 9/2022 Smith
2002/0032980 A1 * 3/2002 Nelson .................. A01M 1/145 43/113
2002/0078620 A1 6/2002 Nelson et al.
2006/0080888 A1 4/2006 Greening
2006/0107583 A1 5/2006 Wu
2006/0150472 A1 * 7/2006 Harris ..................... A01M 1/04 43/113
2009/0100743 A1 * 4/2009 Prater .................. A01M 1/223 43/112
2009/0288333 A1 11/2009 Johnston et al.
2010/0024278 A1 2/2010 Simchoni-barak
2010/0263260 A1 10/2010 Engelbrecht
2010/0308130 A1 * 12/2010 Gruenbacher ........... A61L 9/12 239/34
2011/0078942 A1 * 4/2011 Larsen .................... A01M 1/10 43/113
2012/0005947 A1 * 1/2012 Studer ................... A01M 1/145 43/58
2013/0042519 A1 * 2/2013 Larsen .................... A01M 1/10 43/113
2013/0152451 A1 * 6/2013 Larsen .................... A01M 1/04 43/113
2013/0312314 A1 11/2013 Greening et al.
2016/0000060 A1 1/2016 Sandford
2016/0262367 A1 * 9/2016 Sandford ............. A01M 1/145
2016/0345569 A1 12/2016 Freudenberg et al.
2017/0035039 A1 * 2/2017 Sandford ............. A01M 1/023
2017/0303523 A1 * 10/2017 Sandford ................ F21S 8/035
2018/0184635 A1 7/2018 Studer et al.
2018/0199562 A1 7/2018 Willcox et al.
2018/0235202 A1 8/2018 Sandford et al.
2018/0310543 A1 11/2018 Holmes
2018/0368385 A1 12/2018 Gilbert, II
2019/0008133 A1 1/2019 Llorente Alonso et al.
2019/0045771 A1 2/2019 Rocha et al.
2019/0075776 A1 * 3/2019 Ali ........................ A01M 1/145
2019/0133105 A1 5/2019 Leach et al.
2019/0141977 A1 5/2019 Smith
2019/0141978 A1 5/2019 Smith
2019/0141979 A1 5/2019 Smith
2019/0174736 A1 6/2019 Smith
2019/0261616 A1 8/2019 Studer et al.
2019/0350184 A1 11/2019 Chang et al.
2019/0357516 A1 11/2019 Chang et al.
2020/0113165 A1 4/2020 Sandford et al.
2020/0138004 A1 5/2020 Sandford et al.
2020/0138005 A1 5/2020 Sandford et al.
2020/0138006 A1 5/2020 Sandford et al.
2020/0146273 A1 5/2020 Chang et al.
2020/0214279 A1 7/2020 Tsai et al.
2020/0214280 A1 7/2020 Sandford et al.
2020/0245606 A1 8/2020 Rocha et al.
2021/0105991 A1 * 4/2021 Furner .................. A01M 1/145
2022/0061301 A1 3/2022 Smith et al.
2022/0295775 A1 * 9/2022 Furner .................... A01M 1/02

FOREIGN PATENT DOCUMENTS

CN 2449483 Y 9/2001
DE 8802934 U1 5/1988
DE 29816743 U1 1/1999
EP 3269236 A1 * 1/2018 ............. A01M 1/02
JP H06245676 A 9/1994
KR 20130049475 A 5/2013
KR 20150112755 A 10/2015
WO 8200567 A1 3/1982
WO 9615664 A1 5/1996
WO 9934671 A1 7/1999
WO WO-2005053389 A1 * 6/2005 ........... A01M 1/145
WO 2008067678 A1 6/2008
WO 2018025426 A1 2/2018
WO WO-2018183277 A1 * 10/2018
WO WO-2018183281 A1 * 10/2018
WO WO-2019112831 A1 * 6/2019
WO WO-2019112833 A1 * 6/2019
WO WO-2019112834 A1 * 6/2019
WO WO-2019112835 A1 * 6/2019
WO WO-2020117375 A1 * 6/2020 ............. A01M 1/02
WO 2020136173 A1 7/2020

OTHER PUBLICATIONS

Merged translation of WO_2019112831 (Year: 2019).*
Merged translation of WO_2005053389 (Year: 2005).*
Unpublished U.S. Appl. No. 29/748,553, filed Aug. 31, 2020, Christopher Lawrence Smith.

(56) References Cited

OTHER PUBLICATIONS

Unpublished U.S. Appl. No. 29/796,594, filed Jun. 25, 2021, Christopher Lawrence Smith.
Unpublished U.S. Appl. No. 29/805,487, filed Aug. 27, 2021, Christopher Lawrence Smith et al.
Unpublished U.S. Appl. No. 29/847,539, filed Jul. 26, 2022, Christopher Lawrence Smith.
Unpublished U.S. Appl. No. 29/847,540, filed Jul. 26, 2022, Christopher Lawrence Smith.
Unpublished U.S. Appl. No. 29/847,542, filed Jul. 26, 2022, Christopher Lawrence Smith.

* cited by examiner

FIG. 33A (*Arm at 0°*)

FIG. 33B (*Arm at 90°*)

*Right Profile*
*(Arm at 50°)*

ARTHROPOD TRAPPING DEVICE

FIELD OF THE INVENTION

The present disclosure relates generally to an arthropod trapping device, more particularly, to a compact and portable trapping device comprising a housing and an insert, where the insert is also attachable to or insertable into a handheld trapping implement.

BACKGROUND OF THE INVENTION

Historically, a variety of arthropod control devices have been employed to trap arthropods, particularly insects. Such devices typically employ an attraction mechanism for luring arthropods to the device. Example attraction mechanisms include baits such as food, light, heat, pheromones, or other odorous materials found attractive by the arthropod. Some arthropod control devices have historically included an immobilization mechanism to prevent the arthropods from exiting the device. One type of immobilization mechanism used is a substrate such as a board, a paper, or other medium having a surface coated with an adhesive. Arthropods attracted to the device or incidentally coming into contact with the adhesive become trapped by adhesion.

Arthropod trapping devices that combine an adhesive for trapping insects together with light are known. Arthropod traps having a large fluorescent tube that emits light, for example, UV light, visible light, or both, to attract insects and a glue board to trap them are known. Such traps may be effective at trapping arthropods, but the light emitted by such traps may be too bright for some consumers. Such traps may also be too large to fit in small spaces, too noticeable for some spaces inside the home, such as a kitchen or a bathroom, and too expensive to afford one for every room in the house. Furthermore, the glue boards in these traps may be difficult to remove and replace without touching trapped insects and adhesive. Smaller, disposable arthropod traps that comprise LED lights and an adhesive, have a minimal footprint, and have an aesthetically pleasing design are also known. However, such traps may not be as effective at capturing arthropods as, for example, larger traps having fluorescent tubes.

There is a need for an arthropod trapping device that is effective at capturing arthropods, is not offensively bright, and has a compact, aesthetically pleasing design. There is also a need for a trap that can be maintained and handled without contacting trapped insects or insect debris. The present disclosure meets these needs by providing a device that comprises a housing, which comprises a base and a shade coupled to the base, where the base comprises a light source (e.g., LED) and where the shade is configured to receive an insert that comprises an at least partially reflective, concave, light source-facing surface with an adhesive disposed thereon.

SUMMARY OF THE INVENTION

The present disclosure relates to an insert comprising a) a substrate and a frame for supporting the substrate, where a surface of the substrate has an adhesive disposed thereon, and b) a graspable tab extending from the frame at a second end of the insert, where the insert is configured for insertion into an arthropod trapping device, the adhesive is for trapping the arthropod, and where the graspable tab is substantially free of adhesive.

The present disclosure also relates to an insert comprising a) a substrate and a frame for supporting the substrate, where a surface of the substrate has an adhesive disposed thereon, and b) a downwardly depending tab extending from the frame at a first end of the insert, where the insert is configured for insertion into an arthropod trapping device comprising a slot for receiving the downwardly depending tab and the adhesive is for trapping the arthropod.

The present disclosure also relates to an arthropod trapping device comprising: a housing comprising a base and a shade coupled to the base, the base configured to communicate with and receive power from a power source, where at least one LED is mounted on the base, the shade configured to receive an insert comprising a shade-facing surface and a LED-facing surface, where an adhesive for trapping the arthropod is disposed on the LED-facing surface of the insert, where the at least one LED is configured to emit light toward the LED-facing surface of the shade, where the light is reflected off the shade, off the insert, or off a combination thereof.

The present disclosure also relates to an arthropod trapping device comprising: a housing comprising a base and a shade coupled to the base, the base configured to communicate with and receive power from a power source, where at least one LED is mounted on the base, where the shade is configured to receive an insert comprising a shade-facing surface and an LED-facing surface, where an adhesive for trapping the arthropod is disposed on the LED-facing surface of the insert and the adhesive surface area is greater than or equal to the projected area of the device.

The present disclosure also relates to an arthropod trapping device comprising: a housing comprising a base and a shade coupled to the base, the base configured to communicate with and receive power from a power source, where at least one LED is mounted on the base, the shade configured to receive an insert comprising a shade-facing surface and a LED-facing surface, where an adhesive for trapping the arthropod is disposed on the LED-facing surface of the insert, where the shade overhangs the base.

BRIEF DESCRIPTION OF THE DRAWINGS

FIG. 33A depicts a radial arm that is attached to a drywall test stand;

FIG. 33B depicts a radial arm that is attached to a drywall test stand, where the arm is at 90°;

DETAILED DESCRIPTION OF THE INVENTION

To provide an overall understanding of the devices and methods described herein, certain illustrative embodiments will now be described. For the purpose of clarity and illustration, these devices and methods will be described with respect to arthropod trapping devices used for indoor residential or commercial purposes.

It will be understood by one of ordinary skill in the art that the devices and methods described herein may be adapted and modified as appropriate. The terms "arthropod trapping device," "device," "trapping device," and "trap" are used interchangeably. Arthropods include insects, such as flies, mosquitos, ants, dragonflies, and bees, arachnids, such as spiders, and myriapods, such as centipedes and millipedes.

The present disclosure provides for arthropod trapping devices, methods of making arthropod trapping devices, and methods of using arthropod trapping devices. Various non-limiting embodiments of the present disclosure will now be described to provide an overall understanding of the principles of the function, design and use of the arthropod trapping devices disclosed herein. One or more examples of these nonlimiting embodiments are illustrated in the accompanying drawings. Those of ordinary skill in the art will understand that the methods described herein and illustrated in the accompanying drawings are nonlimiting examples and that the scope of the various nonlimiting examples of the present disclosure are defined solely by the claims. The features illustrated or described in connection with one nonlimiting example can be combined with the features of other nonlimiting examples. Such modifications and variations are intended to be included within the scope of the present disclosure.

Figure 20:
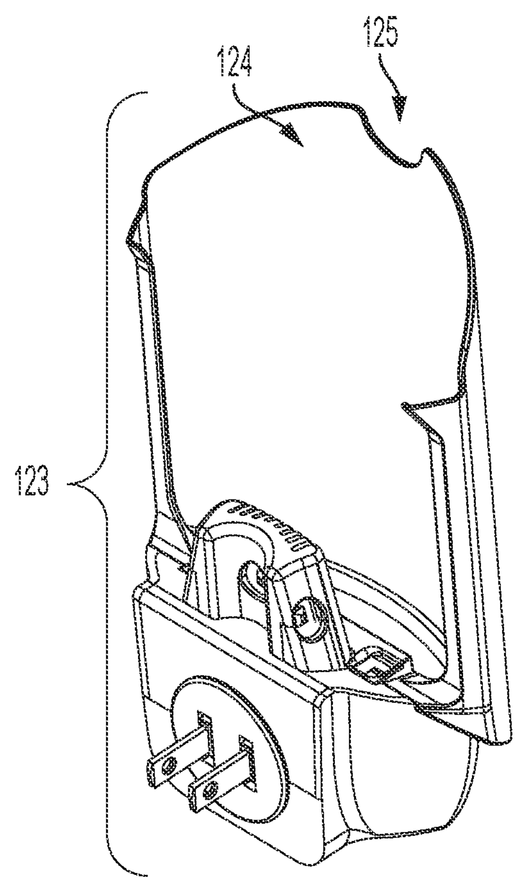
FIG. 20 is a rear, left-side isometric view of the housing shown in FIG. 19.
Figure 21:
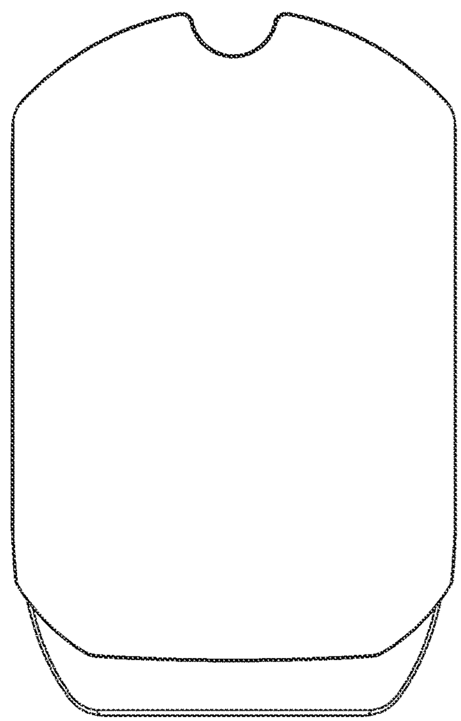
FIG. 21 is a front view of the housing shown in FIG. 19.
Figure 22:
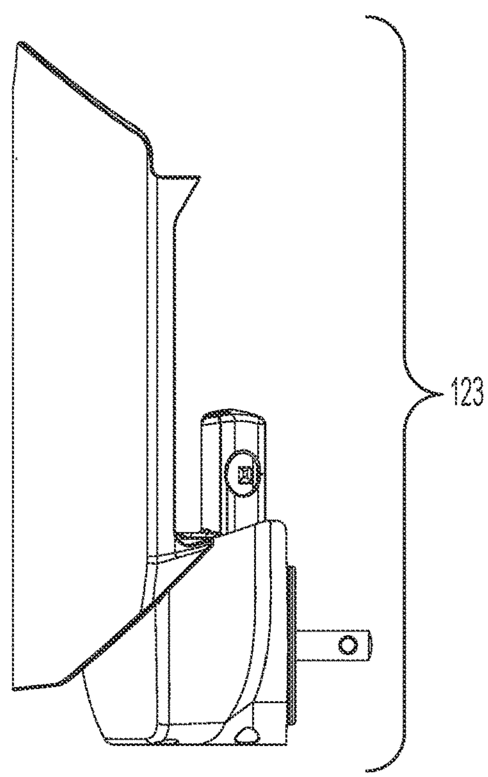
FIG. 22 is a right-side view of the housing shown in FIG. 19.
Figure 23:
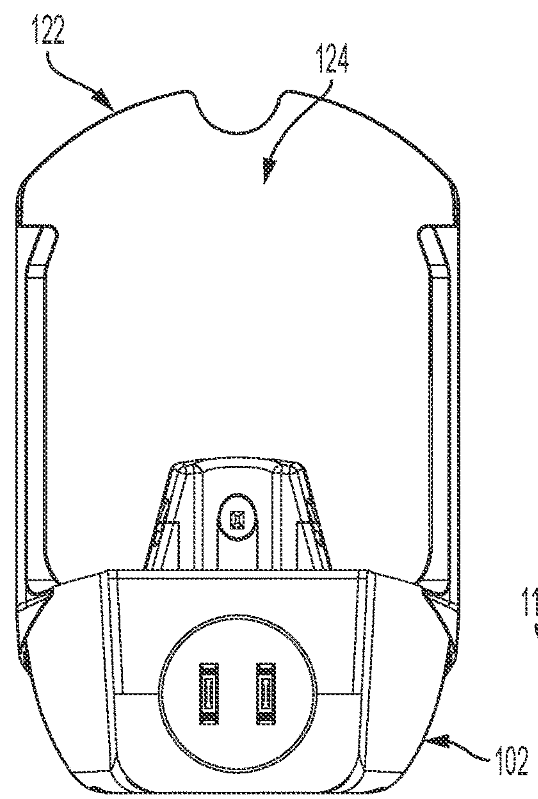
FIG. 23 is a rear view of the housing shown in FIG. 19.
Figure 28:
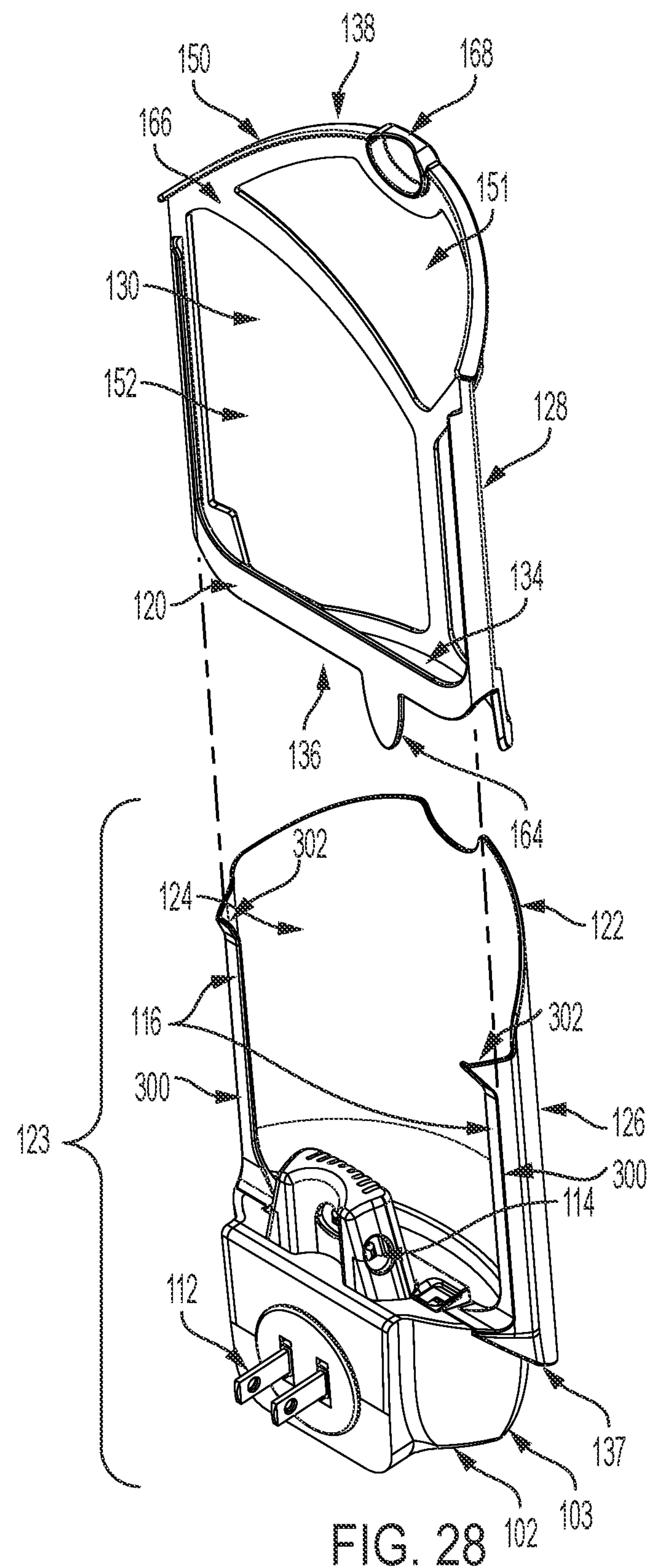
FIG. 28 depicts the insert shown in FIG. 12 being inserted into the housing shown in FIG. 19.

Referring now to FIGS. 1-8 and FIG. 28, an example arthropod trapping device 100 in accordance with one non-limiting embodiment is depicted. The arthropod trapping device 100 may have a housing 123 (see FIG. 28) comprising a base 102 and a shade 122 coupled to the base 102 (see FIG. 20). The shade 122 and the base 102 can be separate pieces that are coupled together to form the housing 123, or the shade 122 and the base 102 may integrally form the housing 123 and the housing 123 may have a unitary construction. The housing 123 may be configured to receive an insert 150. FIG. 28 depicts the insert 150 being inserted into the housing 123. The insert 150 may be mechanically engaged with the housing 123 when the insert 150 is fully seated within the housing 123, such as through interlocking features or a friction-fit, for instance.

Figure 2:
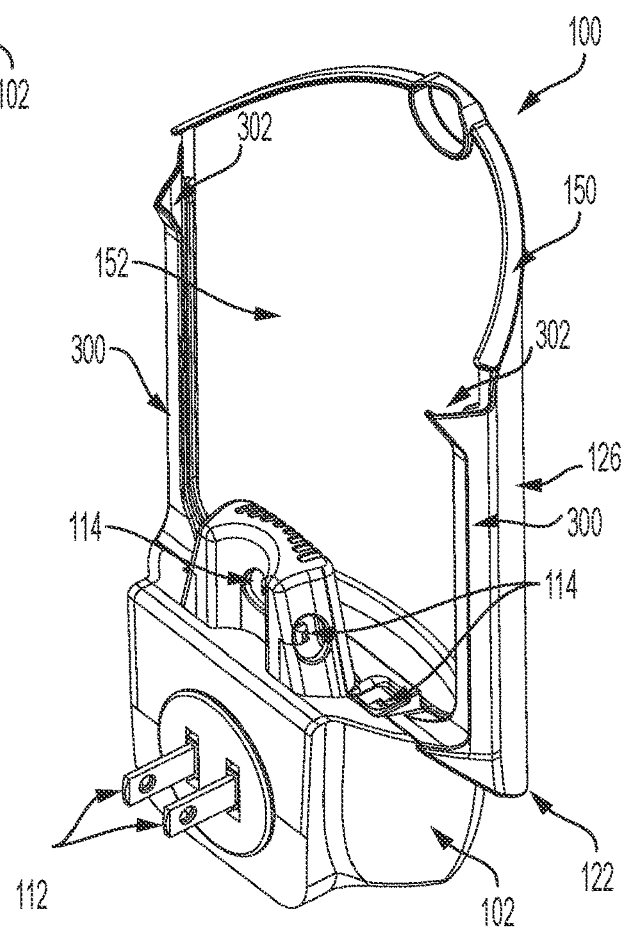
FIG. 2 is a rear, left-side isometric view of the arthropod trapping device shown in FIG. 1.
Figure 12:
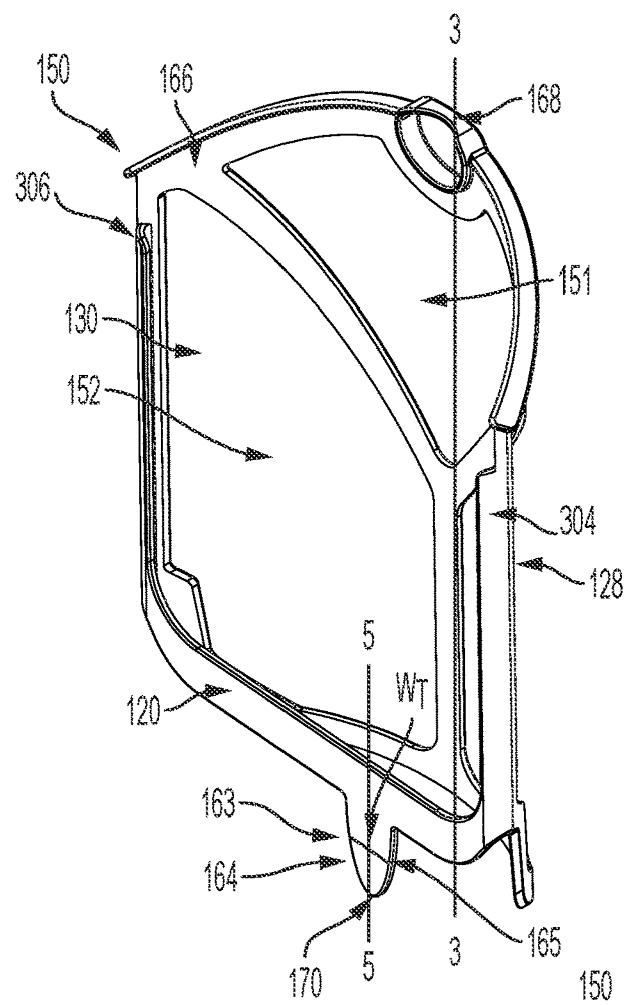
FIG. 12 is a rear, left-side isometric view of an example insert for an arthropod trapping device in accordance with the present disclosure.
Figure 13:
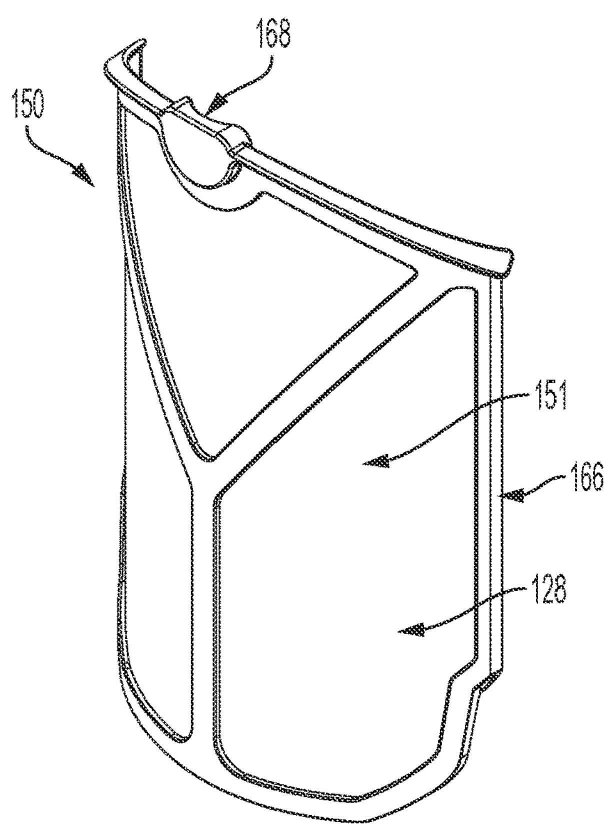
FIG. 13 is a front, right-side isometric view of the insert shown in FIG. 12.
Figure 14:
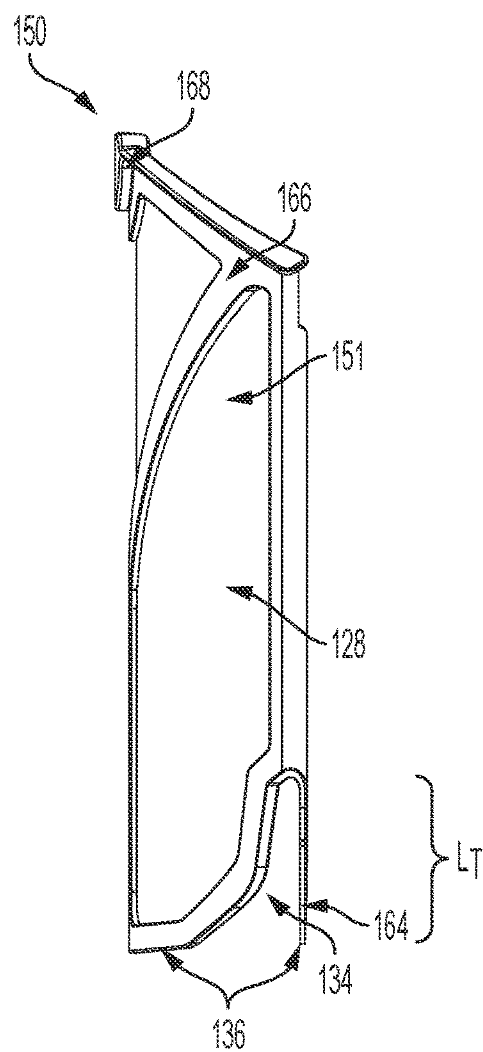
FIG. 14 is a right-side view of the insert shown in FIG. 12.

The shade may comprise at least one, preferably two, guiderails 300, as shown in FIG. 2, to aid in aligning and securing the insert 150, as shown in FIG. 28. The guiderails 300 may have flared openings 302 to receive the insert 150, where the flared openings 302 are wider and/or deeper than the rest of the guiderail. The guiderails 300 may, therefore, help the user to engage the insert with the housing and allow for insertion at various orientations or angles. In other words, the user need not have the trap insert precisely aligned with the trap housing in order to insert the trap insert into the trap housing. The insert may comprise at least one flange 304 (see FIG. 12) configured to slide into the at least one guiderail 300 of the shade 122. The at least one flange 304 may be wider at one end 306, as shown in FIG. 12, preferably the wider end 306 of the flange is aligned with the flared opening 302 of the guiderail, when the insert 150 is inserted into the shade 122. The guiderails may be about 40 mm to about 150 mm in length, or about 50 mm to about 125 mm in length, or about 60 mm to about 100 mm in length. The guiderails may be about 80 mm in length. The length of the flared opening may be about 1% to about 25% or about 5% to about 20% of the length of the entire guiderail. The width and/or depth of the guiderail may further vary over the length of the guiderail, for example, the guiderail may have a reduced width and/or depth at one end, preferably the end opposite the flared opening 302. This reduced width and/or depth may facilitate a friction fit between the insert 150 and the housing 123.

As described in more detail below, an adhesive 152, which immobilizes arthropods that contact it, may be disposed on a surface of the insert 150. The base 102 may include electrical prongs 112, such that the arthropod trapping device 100 may be plugged into a suitable power source, such as a wall socket. In other configurations, the arthropod trapping device 100 can draw power from an onboard battery or other type of power source (i.e., solar). The arthropod trapping device 100 can utilize a variety of attractants to draw insects into the device, such as heat, light, chemical attractants, and so forth, some of which may require a power source to operate. As such, the power source may be used to energize various onboard components, such as an electric heating element (not shown), a light source 114, such as an LED, and/or other components which may serve to attract insects to the arthropod trapping device 100.

Examples of suitable chemical attractants include water, water vapor, sugar, sugar solution, molasses, honey, yeast, insect-attracting scents, pheromones, and combinations thereof. Further examples of chemical attractants include sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, organic acids including lactic acid and malic acid, and other insect attractants such as eugenol, methyl eugenol, and siglure, or other substances to provide a scent that further increases the insect-attracting efficiency of insect trap. The chemical attractant may be a fruit or piece of fruit such as a banana. Alternatively, a combination of live yeast, sugar, and water, which can produce mosquito-attracting carbon dioxide may be used.

As shown in FIG. 28, the shade 122 may have an outward-facing surface 126 and an insert-facing surface 124, which may be configured to receive an insert 150 comprising a shade-facing surface 128 and a LED-facing surface 130, wherein an adhesive 152 for immobilizing an arthropod is disposed on the LED-facing surface 130 of the insert 150. The shade 122 may include opposing guide rails 116 extending at least partially along the insert-facing surface 124 of the shade 122. The guide rails 116 may maintain the relative placement of an insert 150 via friction fit, for example, when an insert 150 is slid into the shade 122. Other techniques may be used to mechanically engage the insert 150 with the shade 122.

The shade 122 and/or insert may be opaque. The shade 122 and/or insert may have regions that are opaque. The opacity of the shade and the insert may be measured according to ASTM D1746-15. The shade may have a regular transmittance ($T_r$) of less than about 10%, or less than about 5%, or less than about 2%, or less than about 1%, or less than about 0.5%. The insert may have a regular transmittance ($T_r$) of less than about 90%, or less than about 75%, or less than about 50%, or less than about 30%, or less than about 20%, or less than about 10%, or less than about 5%, or less than about 2%, or less than about 1%, or less than about 0.5%. The shade or insert may have a greater regular transmittance ($T_r$) in one region than in another region. The shade or insert may have a color(s). The shade and/or insert may conceal trapped arthropods and debris. During use, the opacity of the shade and/or insert may also reduce how bright the trap appears, as compared to the rest of the room where the trap is being used.

The outward-facing surface 126 of the shade may be convex and the insert-facing surface 124 of the shade may be concave. The insert-facing surface 124 of the shade may be configured to receive an insert 150 comprising a convex shade-facing surface 128 and a concave light source-facing surface 130, preferably the light source is a LED and the light source-facing surface 130 is a LED-facing surface 130. The insert 150 may comprise a graspable tab 168 located at a second end 138 of the insert 150. The insert 150 may comprise a mounting bracket 120 spaced apart from the light source-facing surface 130 of the insert 150 and located at a first end 136 of the insert 150, such that the light source-facing surface 130 of the insert 150 and the bracket 120 collectively define an opening 134 in the insert 150 (see FIG. 25). The first end 137 of the shade 122 and the first end 136 of the insert 150 are the ends proximate to the base 102 (with regard to the insert 150, when the insert 150 is inserted into the shade 122, as it would be during use). The opposing sides of the opening 134 may be tapered, grooved, or otherwise configured to aid in proper alignment of the insert 150 as it is slid into the housing 123 by a user. Preferably, the surface of the shade 122 and the surface of the insert 150 are devoid of openings that are large enough to allow arthropods to enter through the openings into the trap.

Figure 24:
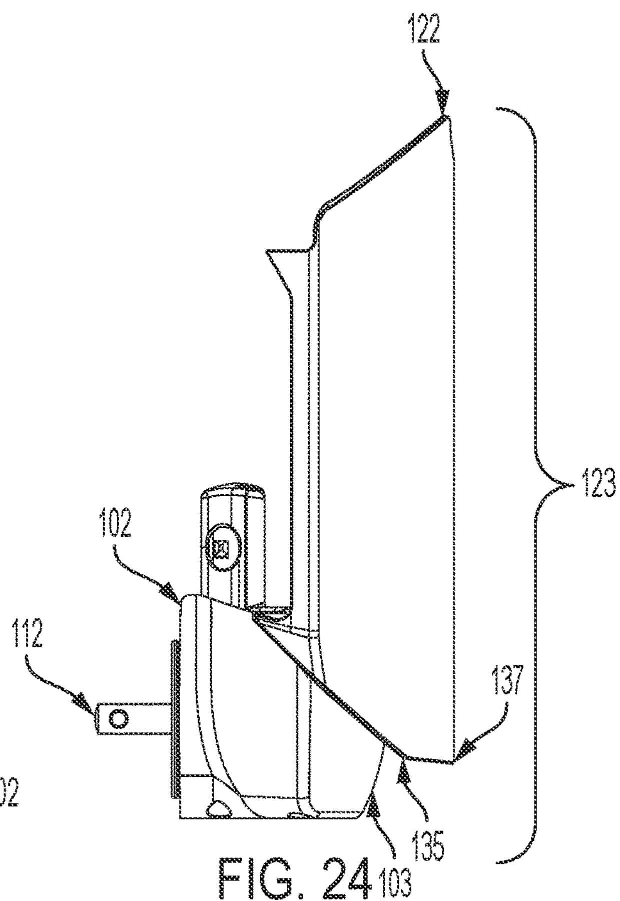
FIG. 24 is a left-side view of the housing shown in FIG. 19.
Figure 25:
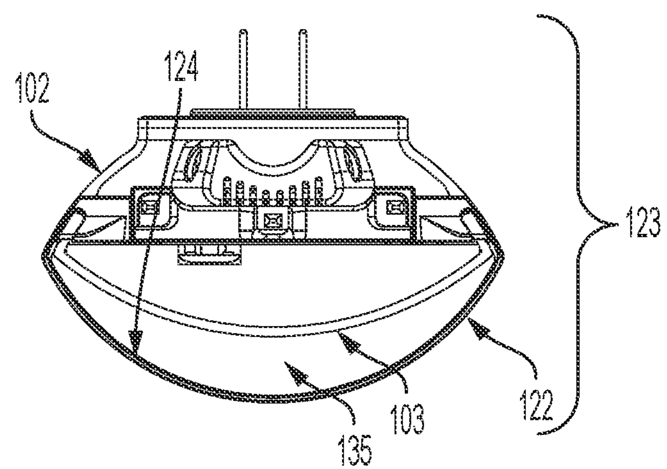
FIG. 25 is a top view of the housing shown in FIG. 19.
Figure 26:
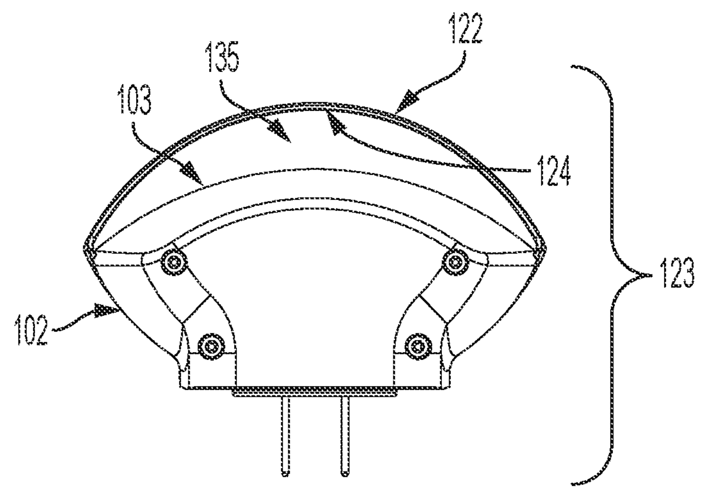
FIG. 26 is a bottom view of the housing shown in FIG. 19.

The first end 137 of the shade 122 may overhang the base 102, where the first end 137 of the shade and the base 102 may define an opening 135 in the housing 123 (as shown in FIGS. 24-26). The opening 135 in the housing 123 may be formed between the insert-facing surface 124 of the shade 122 and the outward-facing wall 103 of the base 102. The opening 135 in the housing 123 may provide an additional opportunity for arthropods to enter the trapping device 100, particularly crawling arthropods. Light may escape through the opening 135 in the housing 123 (at the bottom of the trap) and attract additional insects to the trap. The opposing sides of the opening 135 in the housing may be tapered, grooved, or otherwise configured to aid in proper alignment of the insert 150 as it is slid into the housing 123 by a user. The opening 135 in the housing may have a similar shape and size as the opening 134 of the insert 150, such that the insert does not cover, block, or impede arthropod entry through the opening 135 in the housing, when the insert 150 is seated in the housing 123.

FIGS. 12-17 shown an insert 150. The insert 150 may comprise a frame 166 and a substrate 151 attached to or otherwise formed with the frame 166. The adhesive 152 for immobilizing the arthropod may be disposed on a surface of the substrate 151, preferably on the light source-facing surface 130 of the insert. The adhesive 152 immobilizes arthropods that land on the light source-facing surface 130 of the insert and contact the adhesive 152. The adhesive 152 may be coated on or otherwise applied to or incorporated in or on the substrate 151. The adhesive 152 may be disposed on both the shade-facing surface 128 and the light source-facing surface 130 of the insert 150. In such configurations, there is preferably a space between the shade-facing surface 128 of the insert 150 and the insert-facing surface 124 of the shade 122, and arthropods may land on the shade-facing surface 128 of the insert 150, the light source-facing surface 130 of the insert 150, or both.

The adhesive 152 may be selected from the group consisting of an acrylic polymer adhesive, a butyl rubber adhesive, a natural rubber adhesive, a nitrile adhesive, a silicone adhesive, a styrene block copolymer adhesive, a styrene-ethylene/propylene adhesive, a styrene-isoprene-styrene adhesive, a vinyl ether adhesive, and mixtures thereof. The adhesive may optionally be a pressure sensitive adhesive. The substrate 151 may be provided in a wide variety of forms, such as a film, a woven or a non-woven (including papers). The substrate 151 may be in the form of a film comprising one or more polymers, such as polycarbonate, polyethylene terephthalate (PET) or polypropylene. The substrate 151 may comprise one or more layers. Generally, the thickness of the substrate 151 (with or without adhesive 152 disposed thereon) may be in the range of about 0.01 mm to about 5 mm. The thickness of the substrate 151 (with or without adhesive 152 disposed thereon) may be in the range of about 0.05 mm to about 1.0 mm. The adhesive surface area (area of the surface of the device or insert that has adhesive 152 disposed thereon, see, for example, FIG. 30) may be from about 25 $cm^2$ to about 200 $cm^2$, or from about 50 $cm^2$ to about 175 $cm^2$, or from about 75 $cm^2$ to about 150 $cm^2$, or from about 100 $cm^2$ to about 145 $cm^2$.

Figure 29:
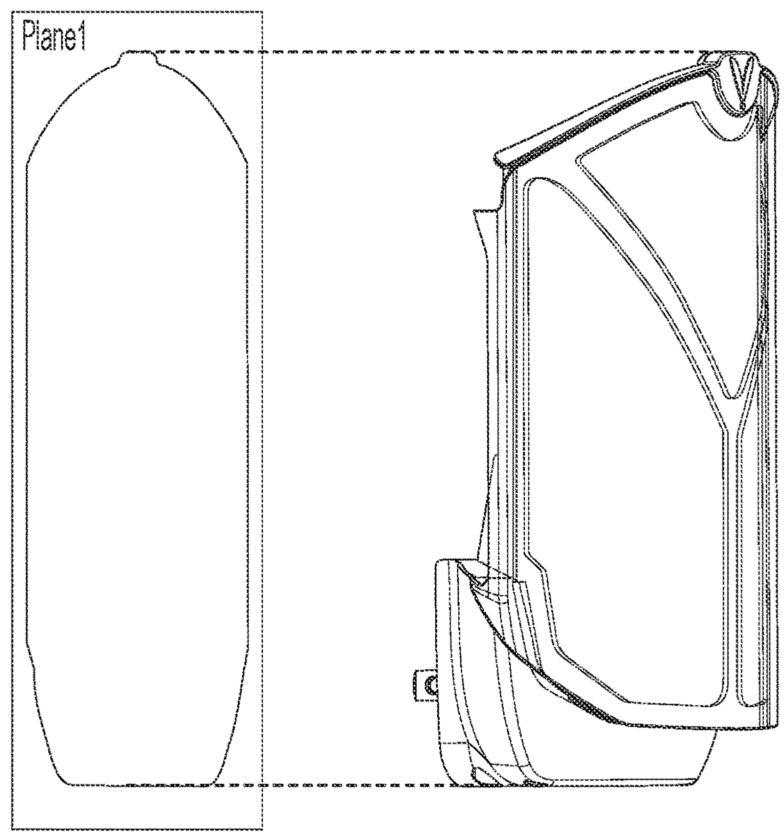
FIG. 29 depicts the projected area of the arthropod trapping device shown in FIG. 1 on to Plane 1.
Figure 30:
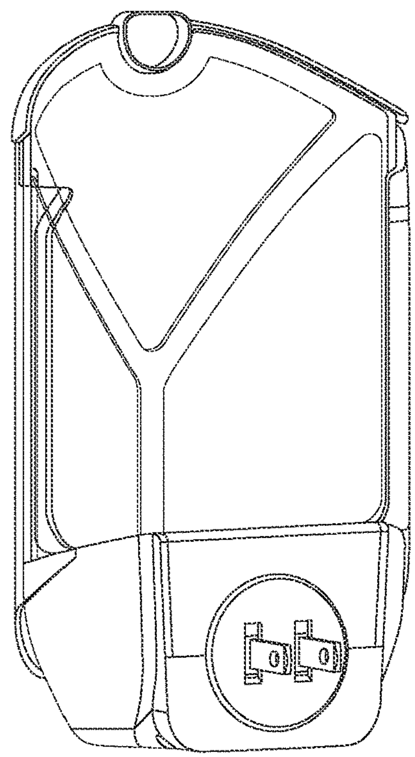
FIG. 30 is a rear, right-side isometric view of the arthropod trapping device shown in FIG. 1.

The adhesive surface area may be greater than or equal to the projected area of the trapping device, as shown in FIGS. 29-30. "Projected area" as used herein means the two-dimensional area measurement of the arthropod trapping device by projecting the shape of the device on to an arbitrary plane, where the adhesive faces the plane, as shown in FIG. 29. FIG. 30 shows the adhesive surface area of the device in FIG. 29. The projected area may be determined, for example, by area calculations of a known geometry, a curve integrator, super imposing the actual drawn area on grid paper with predetermined area markings. The projected area may be measured using known computer aided design (CAD) software, such as Solidworks®. The projected area of the arthropod trapping device may be from about 20 $cm^2$ to about 170 $cm^2$, or from about 40 $cm^2$ to about 150 $cm^2$, or from about 60 $cm^2$ to about 125 $cm^2$. The ratio of the adhesive surface area to the projected area of the device may be from about 5:1 to about 1:1, or from about 3:1 to about 1:1, or from about 2:1 to 1:1, or from about 1.5:1 to about 1:1, or from about 1.2:1 to about 1:1.

The adhesive 152 may be opaque, transparent, or translucent. The substrate 151 may be opaque, transparent, or translucent. The substrate 151 (with or without adhesive disposed thereon) may have a regular transmittance ($T_r$) of less than about 90%, or less than about 75%, or less than about 50%, or less than about 30%, or less than about 20%, or less than about 10%, or less than about 5%, or less than about 2%, or less than about 1%, or less than about 0.5%. Preferably, both the adhesive 152 and the substrate 151 are transparent or translucent. The substrate 151 with the adhesive 152 disposed thereon may have a regular transmittance ($T_r$) of greater than about 50%, or greater than about 75%, or greater than about 85%, or greater than about 90%, or greater than about 92.5%, or greater than about 95%, or greater than about 97.5%, or greater than about 99%, or greater than about 99.5%. More specifically, the substrate 151 may transmit greater than about 50%, or greater than about 60%, or greater than about 70%, or greater than about 80% of UV light. The substrate 151 may transmit greater than about 50%, or greater than about 70%, or greater than about 90% of blue light. The adhesive 152 may transmit less than about 60%, or less than about 50%, or less than about 40% of UV light. The adhesive 152 may transmit greater than about 50%, or greater than about 70%, or greater than about 90% of blue light. The substrate 151 with the adhesive 152 disposed thereon may transmit less than about 50%, or less than about 40%, or less than about 30% of UV light. The substrate 151 with the adhesive 152 disposed thereon may transmit greater than about 50%, or greater than about 70%, or greater than about 90% of blue light.

A transparent or translucent substrate 151 having a transparent or translucent adhesive 152 disposed thereon allows for captured arthropods to be viewed through the substrate, without fully removing the insert 150 from the housing 123 and/or without directly examining the adhesive surface of the insert. Thus, a user need not fully remove insert from the housing and rotate the insert in order to view the captured arthropods and/or determine if the insert should be disposed of and replaced with a new insert. A releasable liner (not shown) may be applied to the adhesive 152 to cover and protect the adhesive 152 prior to use. A user may peel away the releasable liner to expose the adhesive 152 immediately prior to inserting the insert 150 into the shade 122.

While the insert 150 is shown to include a frame 166 that surrounds the entire perimeter of the insert 150, this disclosure is not so limited. For instance, the frame 166 may only extend partially around the perimeter of the insert 150. The frame 166 may, for example, extend along all but the first end 136 of the insert 150. In other configurations, the insert 150 can be frameless, with the adhesive portion 152 applied to at least a central portion of the substrate 151, with the substrate 151 providing sufficient structural rigidity. Further, the insert 150 and/or the substrate 151 may be concave-convex (where one surface of the substrate is concave and the opposing surface of the substrate is convex) or have other suitable configurations, such as planar or pleated, for instance. Opposing edges of the frame 166 may be connected, for example as shown in FIGS. 12-18, to provide additional structural support and rigidity to the insert 150.

The insert 150 may comprise a reservoir (not shown) for storing an insect attracting composition. The insect attracting composition can be provided in a wide variety of forms, including gases, liquids, solids and combinations thereof. Solid compositions also include semi-solid compositions, such as gels, which comprise one or more liquids and one or more gelling agents. The reservoir may also serve to catch fallen insects, such as the insects that were originally immobilized by the adhesive 152 but are no longer sufficiently retained by the adhesive 152 after drying and becoming brittle. The reservoir may have a volume between about 1 $cm^3$ and 60 $cm^3$. Reservoirs may be made as one piece, which is then attached to the frame. Alternatively, reservoirs, may be integrally formed with the frame from the same material, such as by an injection molding or thermoforming process. The reservoir may be positioned so as not to reduce the surface area of the adhesive 152. Alternatively, the insert 150 may not include a reservoir.

Figure 3:
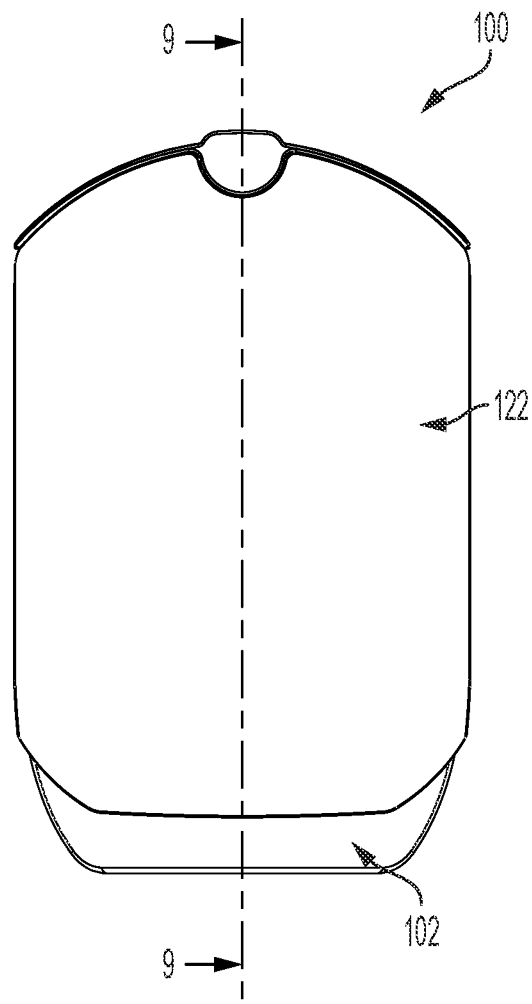
FIG. 3 is a front view of the arthropod trapping device shown in FIG. 1.
Figure 4:
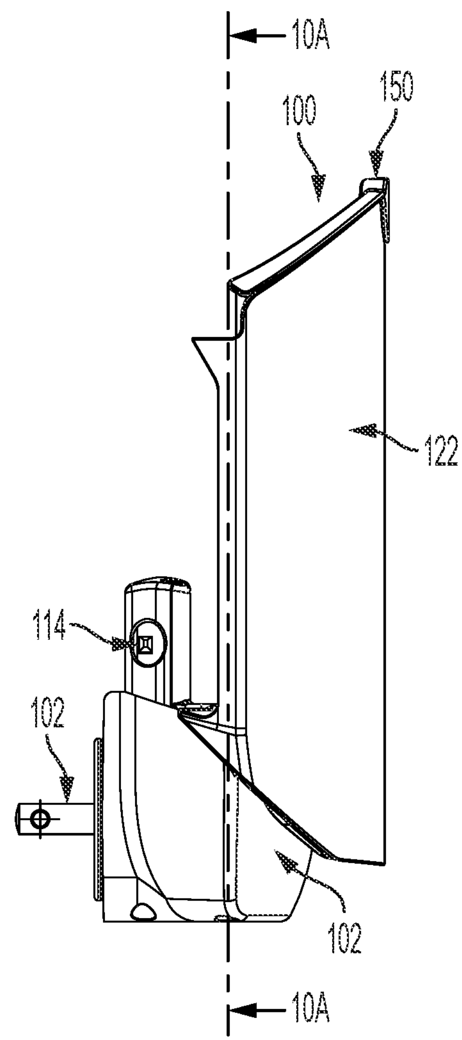
FIG. 4 is a left-side view of the arthropod trapping device shown in FIG. 1.
Figure 5:
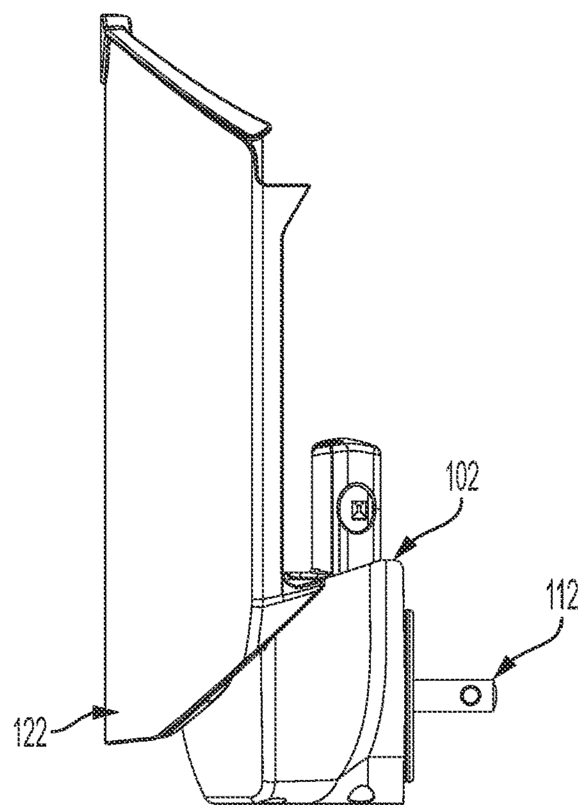
FIG. 5 is a right-side view of the arthropod trapping device shown in FIG. 1.
Figure 6:
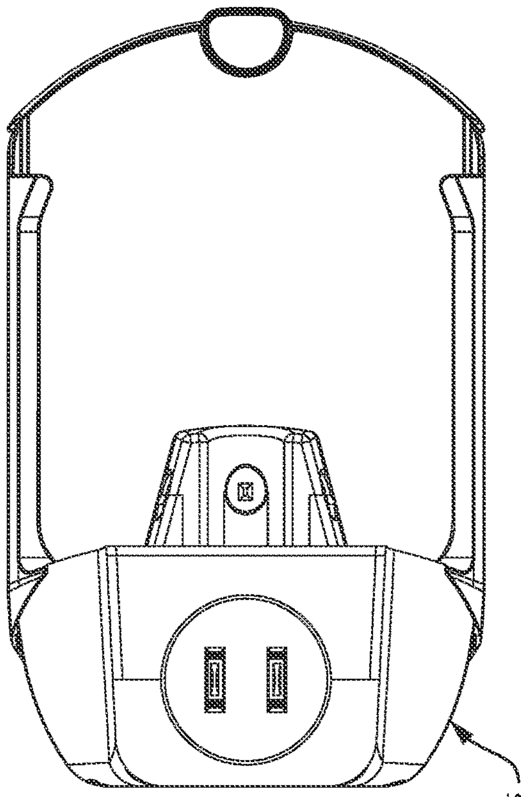
FIG. 6 is a rear view of the arthropod trapping device shown in FIG. 1.
Figure 7:
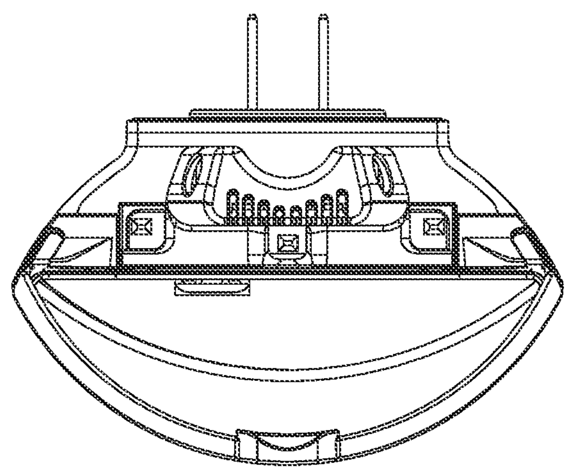
FIG. 7 is a top view of the arthropod trapping device shown in FIG. 1.
Figure 8:
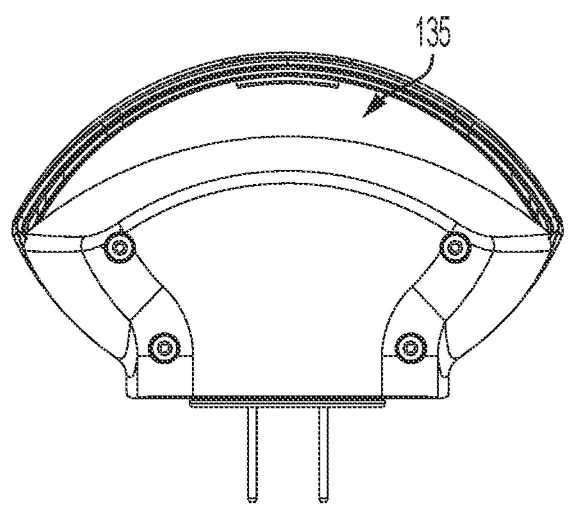
FIG. 8 is a bottom view of the arthropod trapping device shown in FIG. 1.

As shown in FIG. 3, a longitudinal centerline 3-3 may divide the trap 100, including the housing 123 and the insert 150, into lateral sides. For symmetrical inserts, the longitudinal centerline will divide the insert into two symmetrical halves. For asymmetrical inserts, the longitudinal centerline passes vertically (with respect to the configuration of the insert when inserted into a housing, with the device plugged into a conventional wall outlet) through its geometric center.

As shown in FIG. 12, the insert 150 may comprise a downwardly depending tab 164. The downwardly depending tab 164 may be positioned on the first end 136 of the insert 150. The downwardly depending tab 164 may extend downwardly from the mounting bracket 120. As described above, the mounting bracket 120 may be spaced apart from the LED-facing surface 130 of the insert 150, such that the LED-facing surface 130 of the insert 150 and the bracket 120 collectively define an opening 134 in the insert 150. The maximum distance between the LED-facing surface 130 of the insert 150 and the bracket 120, measured at the longitudinal centerline 3-3 of the insert 150, may be from about 5 mm to about 50 mm, or from about 10 mm to about 40 mm, or from about 10 mm to about 35 mm.

The downwardly depending tab 164 can be positioned such that a longitudinal centerline 5-5 of the downwardly depending tab 164 is laterally offset from a longitudinal centerline 3-3 of the insert 150, as shown in FIG. 12. Laterally offsetting the downwardly depending tab 164 may serve to aid in properly aligning the insert 150 with the base 102. As shown, due to this lateral offset of the tab 164, the longitudinal centerline 3-3 of the insert does not overlap any portion of the tab 164. In this regard, the first side edge 163 and the second side edge 165 of the tab 164 are each laterally offset from the longitudinal centerline 3-3 of the insert 150. The second side edge 165 may be laterally offset from the longitudinal centerline 3-3 further than the first side edge 163. Furthermore, since the first side edge 163 and the second side edge 165 are offset in the same lateral direction, both the first side edge 163 and the second side edge 165 of the tab 164 may be positioned on the same lateral side of the insert 150. The longitudinal centerline 5-5 of downwardly depending tab 164 may be laterally offset from the longitudinal centerline 3-3 of the insert 150 by about 5 mm to about 25 mm, or from about 8 mm to about 20 mm, or from about 10 mm to about 15 mm.

The base 102 may receive the downwardly depending tab 164, when the insert 150 is inserted into the housing 123. The base 102 may comprise a switch 107, as shown in FIG. 10, which may function to operate one or more of the insect attractants (e.g., a light source 114, etc.), so that such insect attractants can only be energized when the insert 150 is engaged with the base 102. As such, when the insert 150 is removed from the base 102, the switch is deactivated and the insect attractant(s) are no longer powered.

More specifically, the insert 150 may only be fully seated into the base 102 when the insert 150 is facing the proper direction so that the downwardly depending tab 164 is received into a slot 101 in the base 102. Furthermore, the downwardly depending tab 164 can help to ensure the insert 150 is properly inserted into the shade 122. The downwardly depending tab 164 can also function as a convenient grip point for the user during insertion or removal of the insert 150. The downwardly depending tab 164 can have any suitable configuration or shape.

The downwardly depending tab 164 may have a maximum width ($W_T$) that is less than 75% of the width of the mounting bracket 120 of the insert 150, or less than 50% the width of the mounting bracket 120 of the insert 150, or less than 25% the width of the mounting bracket 120 of the insert 150, or less than 10% the width of the mounting bracket 120 of the insert 150. The maximum width ($W_T$) of the downwardly depending tab 164 may be from about 5 mm to about 20 mm, or from about 8 mm to about 15 mm, or from about 10 mm to about 13 mm. The length ($L_T$) of the downwardly depending tab 164 may be from about 5 mm to about 40 mm, or from about 10 mm to about 30 mm, or from about 15 mm to about 25 mm. The downwardly depending tab 164 may be substantially planar. The tab 164 may have a first side edge 163 on one side and a second side edge 165 on the other side. Depending on the configuration of the tab 164, the first side edge 163 and the second side edge 165 can converge at a most proximal point 170 of the tab 164. It is to be appreciated that a variety of tab configurations can be utilized without departing from the scope of the present disclosure. For instance, the size, location, and structure of the tab may vary.

Figure 15:
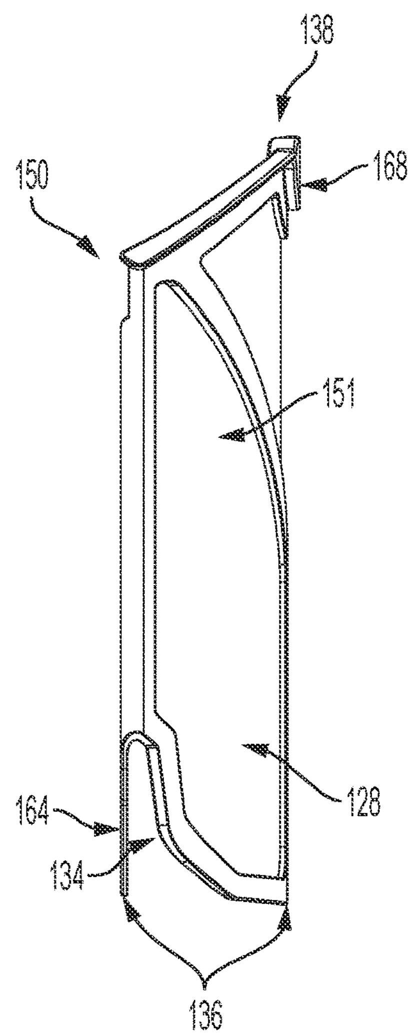
FIG. 15 is a left-side view of the insert shown in FIG. 12.
Figure 16:
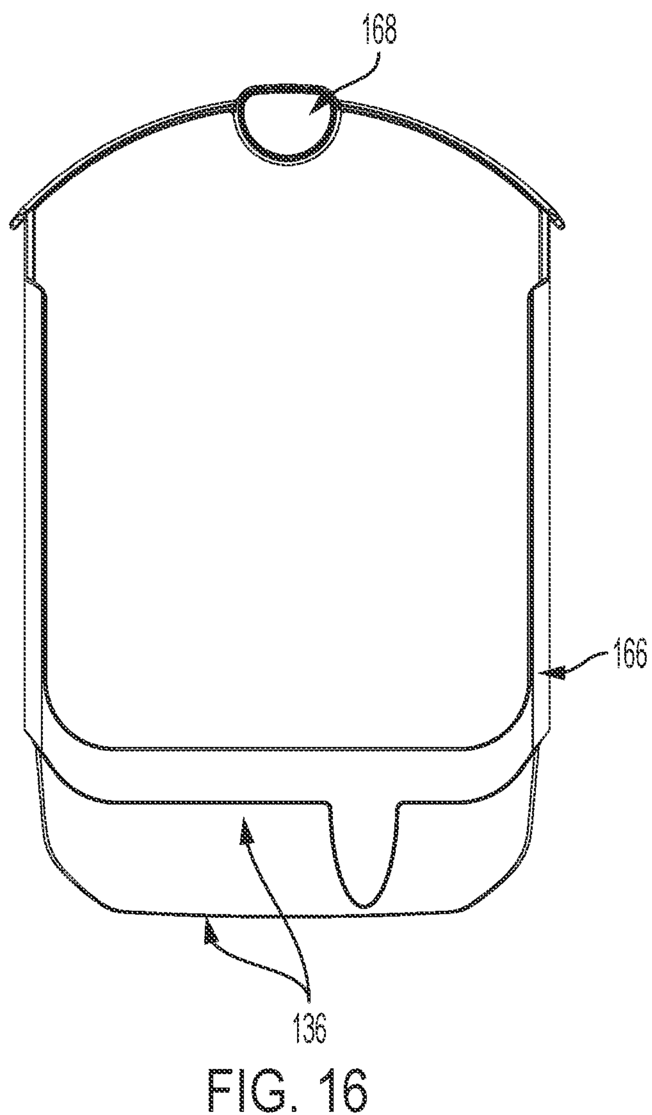
FIG. 16 is a rear view of the insert shown in FIG. 12.
Figure 17:
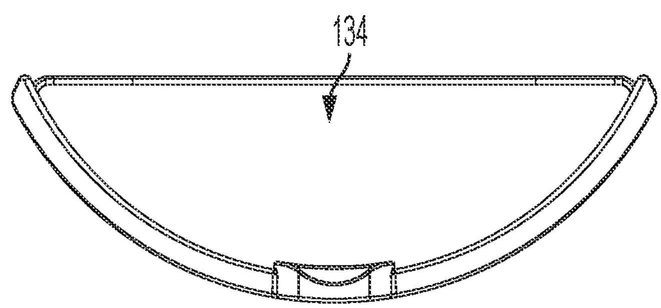
FIG. 17 is a top view of the insert shown in FIG. 12.
Figure 18:
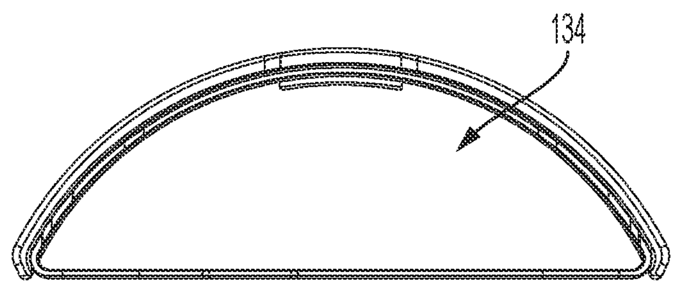
FIG. 18 is a bottom view of the insert shown in FIG. 12.
Figure 19:
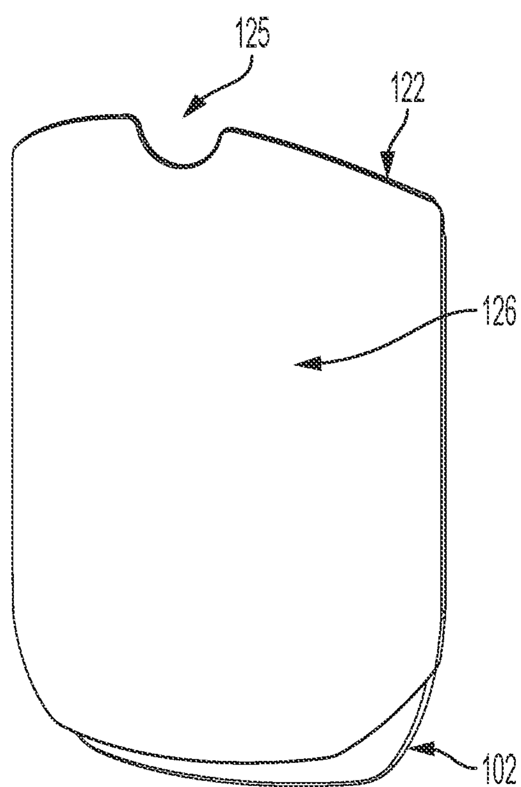
FIG. 19 is a front, right-side isometric view of an example housing for an arthropod trapping device in accordance with the present disclosure.

The insert 150 may comprise a graspable tab 168. The graspable tab 168 may be positioned on the second end 138 of the insert 150, as shown in FIGS. 15 and 28. The graspable tab 168 may extend from the frame 166. The graspable tab 168 may be integral to the frame. The graspable tab 168 may function as a convenient grip point for the user during insertion or removal of the insert 150. The graspable tab 168 may be substantially free of adhesive, to allow the user to grasp the insert 150 without contacting the adhesive 152. The graspable tab 168 may be positioned along the longitudinal centerline 3-3 of the insert 150 equidistant from the side edges of the frame 166. Alternatively, the graspable tab 168 may not be positioned along the longitudinal centerline 3-3 of the insert 150 and may be non-equidistant from the side edges of the frame 166. The graspable tab 168 may help to ensure the insert 150 is properly inserted into the housing 123. The shade 122 may have a recess 125 to accommodate the graspable tab 168. The recess 125 may allow the graspable tab 168 to be visible, when a user views the outward-facing surface 126 of the shade 122. The shade 122 may be designed to hide or obscure the insert 150 from view, while the recess 125 allows the graspable tab 168 to be visible. Thus, the graspable tab 168 may indicate to the user where and how to grasp the insert 150. The graspable tab 168 may be visible even when the trap is plugged into a wall outlet. The graspable tab 168 may have any suitable configuration or shape. The dimensions of the graspable tab 168 may be chosen to optimize the grippability of the insert 150, thereby making it easier for a user to grip the insert 150 by the graspable tab 168. The graspable tab 168 may have a surface area of about 50 $mm^2$ to about 500 $mm^2$, or from about 100 $mm^2$ to about 400 $mm^2$, or from about 110 $mm^2$ to about 300 $mm^2$, or from about 120 $mm^2$ to about 200 $mm^2$, or from about 130 $mm^2$ to about 150 $mm^2$.

Figure 27:
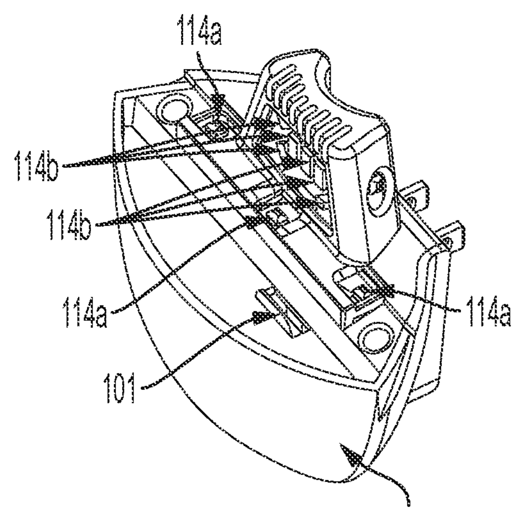
FIG. 27 is a front, right-side isometric view of the base of the housing shown in FIG. 19, without the shade.

FIG. 27 shows the base 102 without the shade 122. As shown in FIG. 27, at least one LED 114, which serves as arthropod attractant, may be mounted on the base 102. The type of light source and the peak wavelength of the light emitted from the light source may be selected to attract particular arthropods, as different arthropods may be attracted to different types of light sources and/or different peak wavelengths of light. The light source 114 is preferably a light emitting diode (LED), as shown, which is a form of solid-state lighting. The arthropod trapping device may comprise at least one LED 114, or from about two to about twenty LEDs 114, or from about two to about ten LEDs 114.

The LEDs 114 may use any suitable attachment technology, such as through-hole technology. One or more of the LEDs 114 may utilize surface-mount technology (SMT), such that the LEDs 114 are a surface-mount device (SMD). The LEDs may be any shape, preferably the LEDS are conical. Each of the LEDs 114 may have a diameter between about 0.5 mm and about 10 mm. Further, each of the LEDs may have a surface area of 0.5 $mm^2$ and about 100 $mm^2$. Some examples of LEDs include semi-conductor light emitting diodes, polymer light emitting diodes, and organic light emitting diodes. The trap may comprise two or more LEDs, where at least one LED is configured to emit light, directly or indirectly, toward the shell and at least one LED is configured to emit light away from the shell.

Other light sources that may be used include, but are not limited to, incandescent or filament-based lights, fluorescent lights, halogen lights, xenon lights or other light sources known in the art. The lights may or may not have a filter to adjust the peak wavelength of their output. Further, as used herein, the light source 114 is the light generating component or element of the lighting technology utilized as the insect attractant. In this regard, the light source 114 may be any of a diode, a filament, an energized gas, and so forth. The light source 114 does not include wiring, connectors, bases, lenses, or elements that may be associated with the light generating component or element.

The arthropod trapping device may comprise at least one LED 114 having a peak wavelength of about 350 nm to about 500 nm, or about 400 nm to about 500 nm, or about 350 nm to about 400 nm. The arthropod trapping device may comprise at least one LED 114 having a peak wavelength of about 350 nm to about 400 nm and at least one LED 114 having a peak wavelength of about 400 nm to about 500 nm. An LED having a peak wavelength of about 400 nm to about 500 nm may emit light toward the shade 122, preferably in a direction substantially perpendicular to the shade. An LED having a peak wavelength of about 350 nm to about 400 nm may emit light in a direction substantially parallel to the shade 122 and/or substantially perpendicular to the shade 122.

Both ultraviolet light (peak wavelength ranging from about 100 nm to about 400 nm) and visible light (peak wavelength ranging from about 400 nm to about 700 nm), especially blue light, are effective at attracting arthropods. High intensity blue light may be optimal for attracting arthropods, but such light may be too bright for use in a user's home. High intensity ultraviolet light may also attract arthropods, but ultraviolet light intensity is preferably moderated for in-home use, as well.

Without being bound by theory, the arthropod trapping device of the present disclosure is designed to effectively balance both blue light intensity and ultraviolet light intensity to increase trapping performance, while providing a trap that is suitable for use in a user's home. It is further believed that emitting light of a selected peak wavelength in a selected direction relative to the shade may optimize trapping performance. For example, a LED having a peak wavelength of about 400 nm to about 500 nm may emit light toward the shade in a direction substantially perpendicular to the shade 122, where some of the light is reflected off the shade and/or insert. In use, when the arthropod trapping device is plugged into a wall socket, the shade and/or insert may reflect the light onto the wall comprising the socket. It is believed that light reflected onto the wall may draw flying arthropods, even from significant distances away, toward the arthropod trapping device. And, when the arthropod approaches the trap, the light having a peak wavelength of about 400 nm to about 500 nm that is emitted toward the LED-facing surface of the insert draws the arthropod to the adhesive disposed on the LED-facing surface of the insert (which faces the wall, in use). Preferably, the intensity of the light emitted toward the LED-facing surface of the insert is greater than the intensity of the light reflected off the shade and/or insert onto the wall.

The arthropod trapping device may produce a halo pattern on the wall, preferably an asymmetric halo pattern. Both direct illumination and indirect illumination, light reflecting off the shade and/or insert onto the wall, may contribute to the halo pattern on the wall. It is understood that the LED arrangement shown in FIG. 27 is an example and the number, type, and position of the LEDs may be modified. Also, reflectors and/or lenses may be used to shape the light pattern. The halo pattern on the wall may be produce in a number of ways, for example, by adjusting the intensity of the light, by adjusting the directionality of the light, and/or by adjusting the reflectivity of the shade and or insert (thereby adjusting the level of direct illumination versus indirect illumination).

The base 102 may comprise a slot 101. The slot 101 may be a narrow, slit opening. The slot 101 is sized to allow the tab 164 to pass therethrough during insertion of the insert 150 into the base 102. In order to provide proper alignment with the tab 164, the slot 101 is laterally offset from a centerline (not shown) of the base 102. The position of the slot 101 ensures that the first end 136 of the insert 150 may be fully inserted into the base 102 when the insert 150 is properly aligned in the slot 101.

Figure 9:
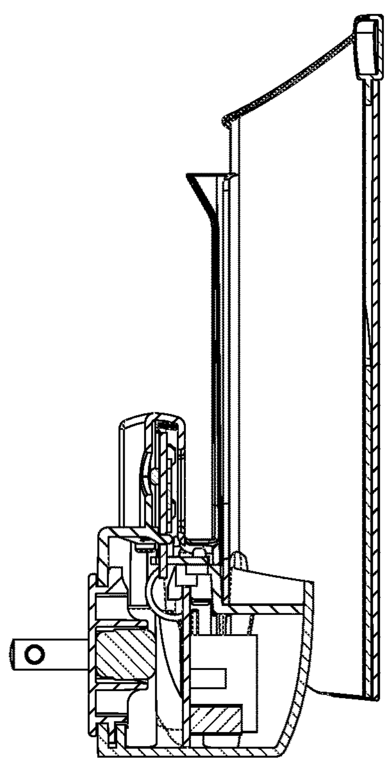
FIG. 9 is a cross-sectional view along plane 3-3 of FIG. 3.
Figure 10A:
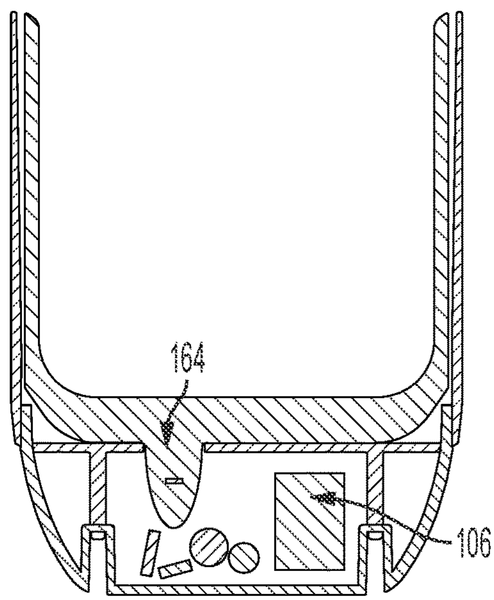
FIG. 10*a*, 10*b* is a cross-sectional view along plane 4-4 of FIG. 4.
Figure 10B:
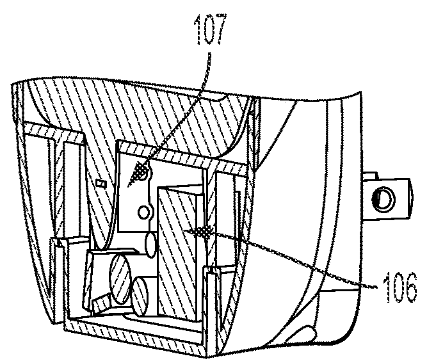
Figure 11:
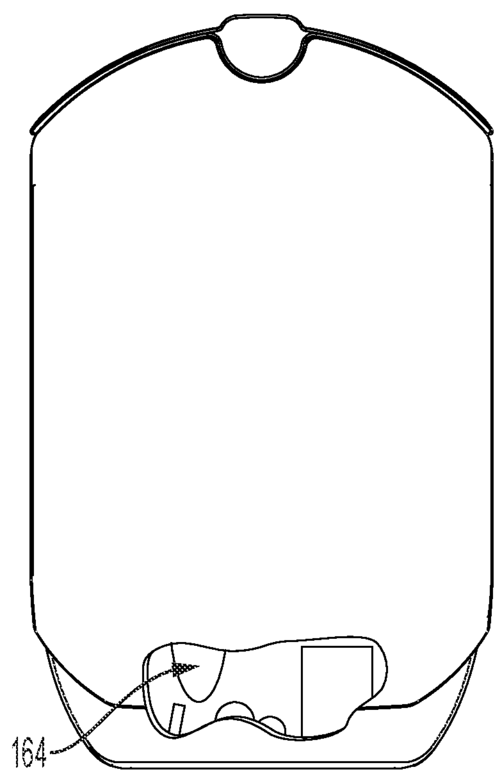
FIG. 11 is a partial cutaway view of the arthropod trapping device shown in FIG. 1.

FIGS. 10*a*-10*b* depict a partial cutaway view of the base 102 with the insert 150 installed. FIG. 9 is a cross-sectional view of the base 102 and the insert 150 taken along line 4-4 in FIG. 4. A circuit board 106 may be vertically oriented within the base 102. Various electrical components may be coupled to the circuit board 106 and extend away from the circuit board 106. Larger components may be centrally positioned on the circuit board 106 due to size constraints and to eliminate interference with other components. The tab 164 of the insert 150 is shown to extend through the slot 101. The tab 164 is shown contacting the switch 107, which is coupled to the circuit board 106, thereby closing the switch 107. The switch 107 is oriented vertically so that the elongate tab slidingly engages a lever, or other type of actuator, of the switch to close the switch. Closing the switch 107 energizes various components of the base 102, such as a light source 114. The base 102 may also include one or more rails (not shown). The rails in the base may be configured such that when the tab 164 is passed through the slot 101, the rails bias the tab 164 against the switch 107, which might otherwise flex outwardly due to its thin and elongate configuration.

The arthropod trapping device may comprise a shade, a base, and no insert, where adhesive is disposed directly on the shade. As such, the shade may be removably attached to the base, and subsequent to use, the entire shade may be removed and disposed of by the user. A fresh shade may then be affixed to the base and operation of the arthropod trapping device can be resumed. The shade may be otherwise similar to the shade that is configured to receive an insert, as described above.

Arthropod trapping devices in accordance with the present disclosure utilize electricity for operation. As provided above, an example arthropod trapping device can be inserted into a wall outlet so that various onboard attractants can be energized, such as a light source and/or other forms of energizable attractants. Such arthropod trapping devices may also include various liquids, gels, or other compositions that serve to attract insects to the arthropod trapping device. As users will periodically interact with the device, such as to replace a spent insert, providing an insect device that is safe and easy to operate is paramount. For instance, in view of various onboard electric componentry, it is desirable for such electric componentry to be de-energized when a user is interacting with the device, such as when a user is removing a spent insert so that it can be replaced with a fresh insert. It is also desirable for such electric componentry to only be energized when an insert is properly inserted into the base. For instance, providing power to a light source only upon proper insertion of the insert provides beneficial operational feedback to the user. Moreover, causing the de-energization of the onboard electric componentry to occur automatically upon removal of the insert is also desirable to provide for ease of use and safe operation. In providing the above referenced safety benefits, it is also beneficial to provide structural features on the insert and base to ensure the user is inserting the insert into the base in the proper orientation.

In accordance with various arthropod trapping devices described herein, a circuit board (i.e., circuit board 106 in FIG. 9) is positioned within the base. Generally, the circuit board receives the power from a power source (e.g., a wall outlet) and distributes the power to the onboard components. The circuit board can be vertically mounted within the base, such that when the arthropod trapping device is plugged into a conventional wall outlet, the internal circuit board is generally parallel to the wall. Vertically positioning the circuit board also serves to provide a compact base.

The circuit board, or collection of circuit boards, can include various componentry, such as, without limitation, voltage control circuitry, capacitors, integrated circuits, resistors, and so forth. The circuit board can also include a switch that can control the supply of electricity to the onboard attractants, such as a heating element and a light source. For instance, when the switch is in a first (open) position, some or all of the onboard electrical attractants are de-energized. When the switch is in a second (closed) position, all of the onboard attractants are energized. Due to the vertical arrangement of the circuit board, the switch can be vertically oriented as well. Placement options for large components on the circuit board can be at least partially dictated by the size constraints of the internal cavity of the base and balanced with the desire to provide a compact base. As such, large components can be centrally located on the circuit board, with other lower profile components (such as a switch) laterally spaced away from the center of the circuit board. In this way, the large components can be positioned as to not interfere with mounting posts, the curvature of base, and so forth, but the overcall form factor of the base can remain generally compact.

The base can include an opening to provide access to the switch that is mounted internal to the base. In order to regulate access to the switch, the opening can be a slot that is positioned vertically above the switch. The slot can be sized to permit an elongated, substantially planar tab to pass through the slot and into the cavity of the base such that the tab can engage the switch. However, the narrowly sized slot beneficially restricts the ability of other foreign objects to be passed through the slot. As provided above, the switch can be laterally spaced away from the center of the circuit board. Accordingly, the slot can be laterally offset from a centerline of the base as well. The substantially planar tab can be laterally offset from the centerline of the insert so that it aligns with the slot and switch when the user attaches the insert to the base.

In some cases, the tab that is passed through the slot may have a certain amount of flex, due it its relatively thin profile and length, for example, that accommodates the narrow slot and switch placement. As such, the base may include one or more vertical rails that are positioned proximate to the switch such that when the tab is passed through the slot, the rails bias the tab toward the switch. When fully inserted, the tab can be positioned between the switch and the rails. The rails can be positioned and configured to ensure the tab sufficiently engages the switch, despite its relatively thin profile and flexibility.

Smart Features

The arthropod trapping devices described herein may include "smart" device features, such as, context-awareness, autonomous computing, and connectivity. A smart arthropod trapping device may be capable of gathering information about its environment and adapting its functioning accordingly, in real time. A smart arthropod trapping device may be capable of performing tasks autonomously, without a command or instructions from a user. And, a smart arthropod trapping device may be able to connect to a data network and/or another device, wired or wirelessly. Connectivity may also allow the trapping device to be a part of the Internet of Things. In fact, connectivity may enable the benefits of context-awareness and autonomous computing to be fully realized. For instance, wireless connectivity may allow the trapping device to share data about its environment with a user, who may then review the data and remotely manage the trapping device accordingly.

A smart arthropod trapping device may include a sensor and a processor (generally referred to as a central processing unit ("CPU")). The smart arthropod trapping device may optionally include a wireless communication antenna (e.g., Wi-Fi, Bluetooth, Zigbee), a feedback element, or a combination thereof. Feedback elements include visual feedback elements, such as a status or indicator LEDs or an LED screen, as well as audible feedback elements, such as a speaker. The sensor may be a camera, a light sensor, a motion sensor, a microphone, a temperature sensor, a $CO_2$ sensor, a barcode scanner/sensor, a QR code scanner/sensor, or a combination thereof. The device may have one or more sensors (which may be the same or different), one more CPUs (which may be the same or different), one or more antennas (which may be the same or different), and/or one or more feedback elements (which may be the same or different). The one or more sensors may be configured in various ways: a sensor may be directed toward the adhesive surface of the trapping device, a sensor may be directed toward the environment surrounding the trapping device, and/or a sensor may be directed to a feature of the insert, for example, a barcode or a QR code on the insert.

The sensor may be configured to detect an arthropod(s) on the adhesive surface, an arthropod(s) near the adhesive surface, an arthropod(s) near the trapping device, a person or a pet near the trapping device or in the same room as the trapping device, ambient light (e.g., daytime or nighttime), sound (e.g., from nearby arthropods or people/pets), motion (e.g., from nearby arthropods or people/pets), ambient temperature (e.g., to maintain a certain temperature in the trapping device), ambient $CO_2$ concentration, the time of insertion of a new insert, insert type or function (e.g., insert designed to trap moths versus flies), proper electronic functioning of the device, device battery life, a catch/trapping event, lack of a catch/trapping event, or a combination thereof.

The smart arthropod trapping device may be capable of turning itself on and off, modifying various properties of the light that it emits (e.g., light color, light intensity, light flicker rate, directionality of light), releasing a chemical attractant, such as a scent, adjusting its temperature, alerting a user that the adhesive surface is full and in need of replacement, emitting a sound (and varying the frequency, pitch, or volume of the sound), or a combination thereof. If the smart arthropod trapping device optionally comprises a fan, the device may be capable of adjusting the fan speed. The device may perform the aforementioned functions autonomously or in response to a command from a user.

The smart arthropod trapping device may include a feedback element and may be capable of activating the feedback element. The feedback element may be located on the device itself and may be a visual feedback element, for example, a status or indicator light that changes color or intensity or flickers, when activated. The feedback element may be a LED screen having text or a picture that appears or changes, when activated. The feedback element may be an audible sound that is emitted, when activated. The feedback element may involve the transmission of data (wirelessly) to a remote device, such as a phone, or to the Internet Cloud, where the data may include trapping device status (e.g., adhesive surface capacity), type of arthropod detected or trapped, number of arthropods detected or trapped, trapping rate, a trapping event (e.g., time, location, type of insect), escape of trapped arthropod, time elapsed since last insert replacement.

Methods of Using Arthropod Trapping Device

The arthropod trapping devices described herein may be used to trap or capture arthropods, preferably insects, more preferably flies. The disclosure relates to a method of trapping arthropods in an arthropod trapping device comprising the steps of inserting an insert having an adhesive disposed thereon into a housing of the arthropod trapping device, where the housing comprises a base having at least one LED mounted on it and a shade coupled to the base, and engaging the base with a power source, where the base may comprise one or more electrically conductive prongs and engaging the base with a power source comprises inserting the electrically conductive prongs into an electrical power outlet. The method may further comprise the step of removing the insert from the housing and disposing of the insert, preferably without contacting the adhesive or arthropod remains adhered thereto, where removing the insert from the housing deactivates a switch in the base to de-energize the LED(s).

These steps may be performed in any order. The arthropod trapping device may be used in any room of a home, including a kitchen, a garage, a screened in porch, or a bathroom. The arthropod trapping device may be used in other buildings as well, including commercial buildings and businesses, e.g., free-standing garages, barns, and the like.

In an alternative configuration of the arthropod trapping device, the insert may be planar, and the shade may be concave-convex. The planar insert is preferably flexible. In use, the user may flex, bend, or deflect the planar insert, when inserting it into the concave-convex shade. As discussed above, the shade may include opposing guide rails extending at least partially along the insert-facing surface of the shade. The planar insert may be held in place by the guide rails. Optionally, the insert may at least partially conform to the shape of the shade.

In this regard, the disclosure also relates to a method of trapping arthropods in an arthropod trapping device comprising the steps of inserting a planar insert having an adhesive disposed thereon into a housing of the arthropod trapping device, where the housing comprises a base having at least one LED mounted on it and a curved or concave-convex shade coupled to the base, and engaging the base with a power source, where the base may comprise one or more electrically conductive prongs and engaging the base with a power source comprises inserting the electrically conductive prongs into an electrical power outlet. The step of inserting the planar insert may comprise flexing, bending, or deflecting the planar insert. The planar insert may optionally comprise a downwardly depending tab that is integrally formed with the insert. Alternatively, the planar insert and the tab—the activation tab—may be provided as two separate pieces and the method may further comprise the step of inserting the activation tab into a slot in the base to activate a switch in the base and to energize the LED(s). The method may further comprise the step of removing the insert from the housing and disposing of the insert, preferably without contacting the adhesive or arthropod remains adhered thereto, and removing the activation tab from the base to deactivate the switch in the base and to de-energize the LED(s).

The disclosure also relates to a refill system or refill kit for an arthropod trapping device, the refill system comprising a planar insert having an adhesive disposed thereon and an activation tab, where the planar insert is configured for insertion into a housing of the arthropod trapping device, where the housing comprises a base having at least one LED mounted on it and a shade coupled to the base, and the activation tab is configured for insertion into a slot in the base, where inserting the activation tab into the base activates a switch in the base to energize the LED(s). The base may comprise one or more electrically conductive prongs for engaging the base with a power source, such as by inserting the electrically conductive prongs into an electrical power outlet.

Handheld Arthropod Trapping Implement

The disclosure also relates to a handheld arthropod trapping implement comprising an insert(s), as described herein, and an elongated handle configured to attach, preferably reversibly, to the insert (and systems and kits thereof). The handheld arthropod trapping device may comprise an elongated handle with a first end and a second end. The first end may comprise a grippable portion that a user can readily grasp and the second end may comprise an engagement feature for engaging, preferably reversibly, the insert. The handle may have a fixed length or it may have an adjustable length, e.g., a telescoping handle. An adjustable handle may have a lock to prevent the handle from extending inadvertently. A user may attach, preferably reversibly, an insert to the elongated handle, grasp the first end of the handle, and manipulate the implement to trap arthropods, preferably flying arthropods, by manually articulating the handle, such that the adhesive surface of the insert comes into physical contact with the arthropods. The insert may be reversibly attachable to the handle via any number of known engagements, including a friction fit, a snap fit, a hook and loop fastener, a magnetic fastener, or a slide fit. Reversible attachment of the insert to the handle allows for convenient disposal of a used insert (when the adhesive surface of the insert is full of trapped arthropods and/or arthropod debris) and attachment of a new insert.

The insert may be pivotably connected to the handle via a joint, such as a pivot joint or a rotary joint, that allows the insert to pivot relative to the handle. The joint may be pivotable or adjustable, such that the user can adjust the angle between the insert and the handle of the trapping implement to make it more convenient to reach hard-to-reach places or to bring the handle to a more comfortable position for the user, in accordance with the height of the user. The pivotable or adjustable joint may provide the user with more flexibility to capture arthropods, by enabling the user to vary the orientation of the insert (and its adhesive surface) relative to the position of the handle (for example, allowing the user to trap or catch an arthropod on a vertical surface, like a wall, or a horizontal surface, like a counter, while the user stands upright). A pivotable or adjustable joint may also allow the handheld trapping implement to collapse or fold up on itself for compact storage.

The pivotable or adjustable joint may be lockable, such that once the user adjusts the implement to the desired angle between the insert and the handle, the user can maintain the desired angle between the insert and the handle by locking the joint that connects the insert and handle. A lockable joint may help to prevent the insert from turning or twisting and/or becoming unsteady as the trapping implement is moved, e.g., across a surface. A lockable joint may also provide the user with additional leverage, when moving the trapping implement, e.g., across the surface. A lockable joint may also be desirable for a handheld trapping implement that collapses or folds up on itself. A variety of joints can be incorporated in the present trapping implements for connecting the insert to the handle of the trapping implement. Non-limiting examples of suitable joints include pivot joints, rotary joints, threaded joints, soldered joints, welded joints, compression joints, ball and socket joints, pin joints, universal joints, and mechanical joints.

Figure 35:
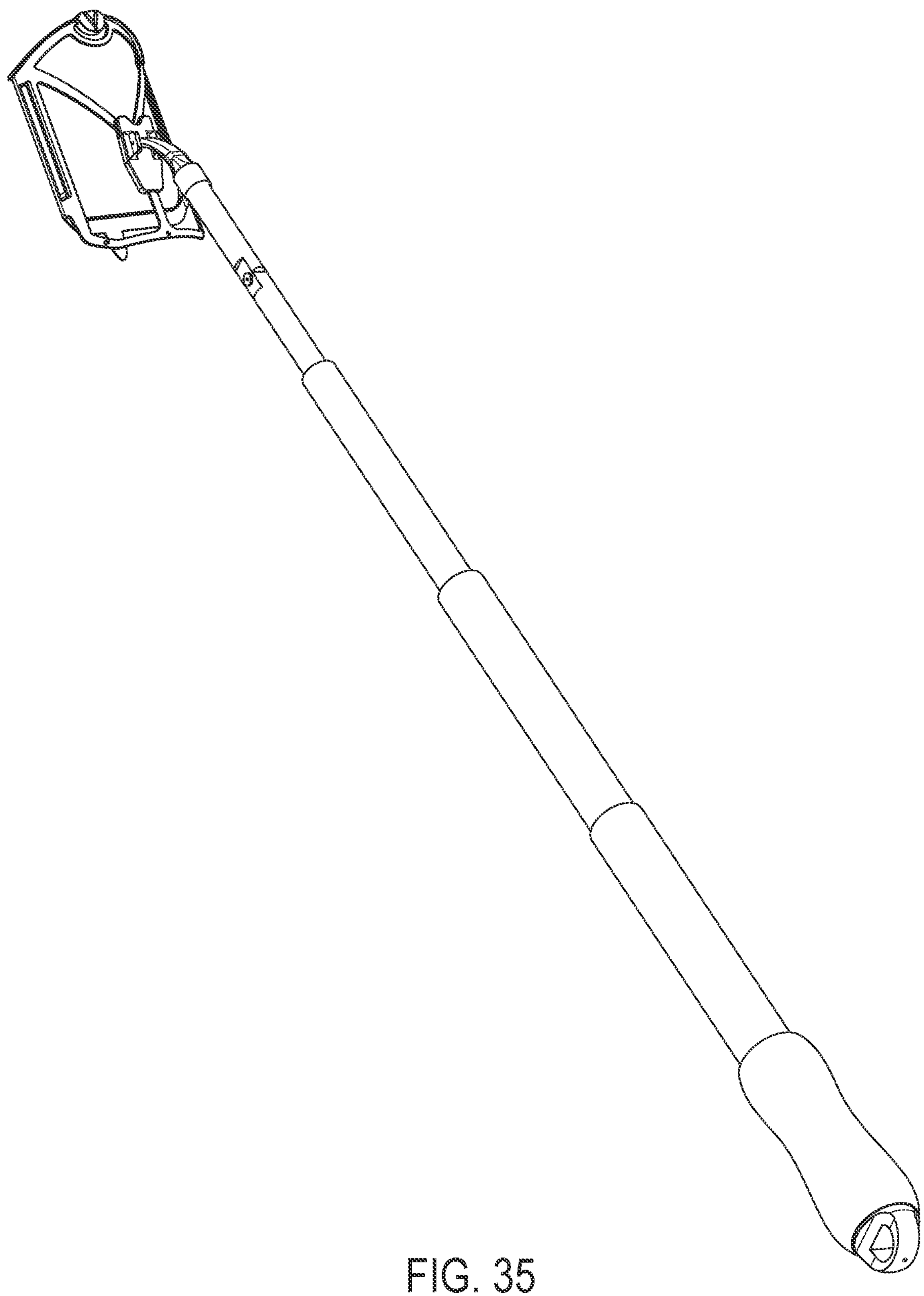
FIG. 35 is an isometric view of an example handheld arthropod trapping implement in accordance with the present disclosure depicting the insert shown in FIG. 12 attached to a handle of the implement.

As shown in FIG. 35, the handheld trapping implement may comprise a handle and a reversibly attachable insert comprising a curved substrate and an adhesive disposed on a surface thereof. In use, a user may grasp the first end of the handle and attach, preferably reversibly, the insert to the second end of the handle. The user may then manually articulate the trapping implement in such a way that the adhesive surface of the insert comes into contact with an arthropod. Preferably, the insert is compatible with the powered arthropod trapping device described herein and the handheld trapping implement, such that the insert may be inserted into the housing of the powered arthropod trapping device or attached to the handle of the handheld trapping implement. Thus, one or more inserts, the powered arthropod trapping device housing, and the handle of the handheld trapping implement may be provided as a system or a kit. A user may place a new insert into the housing of the powered arthropod trapping device and subsequently remove the insert and attach it to the handle of the handheld trapping implement and use the handheld trapping implement remote from the powered device. The user may then remove the insert from handle and replace the insert into the housing of the powered arthropod trapping device. The user can thus readily move an insert from the powered device to the handheld implement in trap and vice versa, until the insert is full of trapped arthropods and/or arthropod debris and ready for disposal. The curved substrate may be particularly beneficial, because the curved substrate allows the user to trap or catch an arthropod on a surface, without the substrate itself adhering to the surface (e.g., versus a planar substrate).

The disclosure also relates to a handheld arthropod trapping implement comprising a shade configured to receive an insert, as described herein, an insert, as described herein, and an elongated handle configured to reversibly or irreversibly attach to the shade configured to receive the insert (and systems and kits thereof). The handheld arthropod trapping device may comprise an elongated handle with a first end and a second end. The first end may comprise a grippable portion that a user can readily grasp and the second end may comprise an engagement feature for reversibly or irreversibly engaging the shade. The handle may have a fixed length or it may have an adjustable length, e.g., a telescoping handle. An adjustable handle may have a lock to prevent the handle from extending inadvertently. A user may reversibly or irreversibly attach a shade to the elongated handle (or the implement may be manufactured with the shade reversibly or irreversibly attached to the handle), insert an insert into the shade, grasp the first end of the handle, and manipulate the implement to trap arthropods, preferably flying arthropods, by manually articulating the handle, such that the adhesive surface of the insert comes into physical contact with the arthropods. The shade may be reversibly attachable to the handle via any number of known engagements, including a friction fit, a snap fit, a hook and loop fastener, a magnetic fastener, or a slide fit.

The shade may be pivotably connected to the handle via a joint, such as a pivot joint or a rotary joint, that allows the shade to pivot relative to the handle. The joint may be pivotable or adjustable, such that the user can adjust the angle between the shade and the handle of the trapping implement to make it more convenient to reach hard-to-reach places or to bring the handle to a more comfortable position for the user, in accordance with the height of the user. The pivotable or adjustable joint may provide the user with more flexibility to capture arthropods, by enabling the user to vary the orientation of the shade (and the insert) relative to the position of the handle (for example, allowing the user to trap or catch an arthropod on a vertical surface, like a wall, or a horizontal surface, like a counter, while the user stands upright). A pivotable or adjustable joint may also allow the handheld trapping implement to collapse or fold up on itself for compact storage.

The pivotable or adjustable joint may be lockable, such that once the user adjusts the implement to the desired angle between the shade and the handle, the user can maintain the desired angle between the shade and the handle by locking the joint that connects the shade and handle. A lockable joint may help to prevent the shade from turning or twisting and/or becoming unsteady as the trapping implement is moved, e.g., across a surface. A lockable joint may also provide the user with additional leverage, when moving the trapping implement, e.g., across the surface. A lockable joint may also be desirable for a handheld trapping implement that collapses or folds up on itself. A variety of joints can be incorporated in the present trapping implements for connecting the shade to the handle of the trapping implement. Non-limiting examples of suitable joints include pivot joints, rotary joints, threaded joints, soldered joints, welded joints, compression joints, ball and socket joints, pin joints, universal joints, and mechanical joints.

Figure 36:
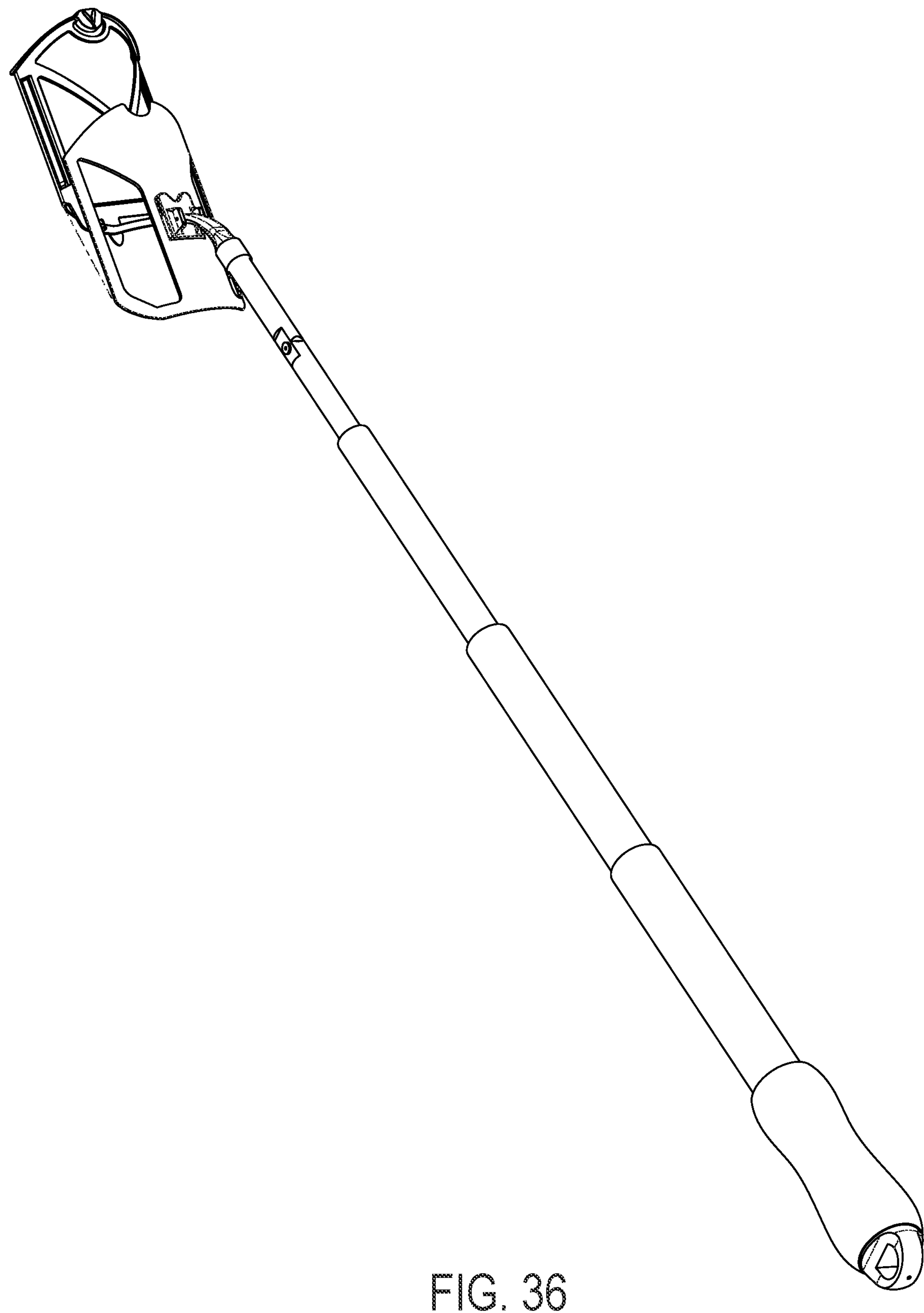
FIG. 36 is an isometric view of another example handheld arthropod trapping implement in accordance with the present disclosure depicting the insert shown in FIG. 12 being inserted into a shade of the implement.

As shown in FIG. 36, the handheld trapping implement may comprise a handle and a curved shade (pre-attached, during manufacture, or attachable by the user) configured to receive an insert comprising a curved substrate and an adhesive disposed on a surface thereof. In use, a user may grasp the first end of the handle, optionally attach the shade to the second end of the handle, and insert the insert into the shade. The user may then manually articulate the trapping implement in such a way that the adhesive surface of the insert comes into contact with an arthropod. Preferably, the insert is compatible with the powered arthropod trapping device described herein and the handheld trapping implement, such that the insert may be inserted into the housing of the powered arthropod trapping device or inserted into the shade of the handheld trapping implement. Thus, one or more inserts, the powered arthropod trapping device housing, the handle of the handheld trapping implement, and an attachable shade may be provided as a system or a kit (alternatively, the shade may be pre-attached to the handle during manufacture). A user may place a new insert into the housing of the powered arthropod trapping device and subsequently remove the insert and insert it into the shade of the handheld trapping implement and use the handheld trapping implement remote from the powered device. The user may then remove the insert from the shade of the handheld trapping implement and replace the insert into the housing of the powered arthropod trapping device. The user can thus readily move an insert from the powered device to the handheld implement in trap and vice versa, until the insert is full of trapped arthropods and/or arthropod debris and ready for disposal. The curved substrate may be particularly beneficial, because the curved substrate allows the user to trap or catch an arthropod on a surface, without the substrate itself adhering to the surface (e.g., versus a planar substrate).

Test Methods

Optical Profile Method

The Optical Profile Method uses a fiber optic spectrophotometer to measure the absolute light intensity across the optical spectrum of a lighted plugin insect trap mounted on a drywall test stand. This test measures A) the light at the surface of the wall, and B) the light radiating away from the wall and device and C) light at the device. The tests are assembled on the same test stand but at non-overlapping regions so as not to interfere with each measurement.

A Modular Spectrophotometer capable of measuring absolute intensity from spectral irradiance of a plane surface in air, within the wavelength range of 350 to 1000 nm (e.g. FLAME-S-VIS-NIR-ES, available from Ocean Insight, Largo, FL, or equivalent) is used. The spectrophotometer is interfaced with appropriate control software (e.g. Ocean-View spectrophotometer software available from Ocean Insight, Largo, FL, or equivalent) that drives the instrument and collects scan data. The spectrophotometer is fitted with an Optical Fiber Assembly, including a fiber optic patch cable (e.g. QP400-1-UV-VIS, available from Ocean Insight, Largo, FL, or equivalent) and a 200-2500 nm optical diffuser Cosine Corrector (e.g. CC-3-UV-S, available from Ocean Insight, Largo, FL, or equivalent) to collect signal at a 180° field of view. The absolute light intensity is calibrated with a NIST traceable radiometrically calibrated light source (e.g. HL-3P-CAL, available from Ocean Insight, Largo, FL, or equivalent). All measures are made in a dark room, where the device is the only light source.

Construction of Test Stand

The test stand includes a vertically mounted piece of drywall (nominally 0.5 in thick), approximately 122 cm high by 91 cm wide, sealed and painted with an ultra-white flat/matte interior paint using a 0.25 in nap roller. The final surface will have minimal texture and a target CIELAB color of L*=97.8, a*=−1.2, b*=2.2 with a ΔE*<2 as measured by ASTM E1349 and ASTM D2244. Power is supplied to the test device based on the residential national standard of the specific country, for example, in the United States, 15A, 120v, and 60 Hz. The mounted plug receptacle on the test stand for the device is a 1 gang outlet box with cover plate, or equivalent. Both the outlet and outlet plate are white. The electrical source is controlled to the residential national standard of the specific country ±2 volts.

Figure 32:
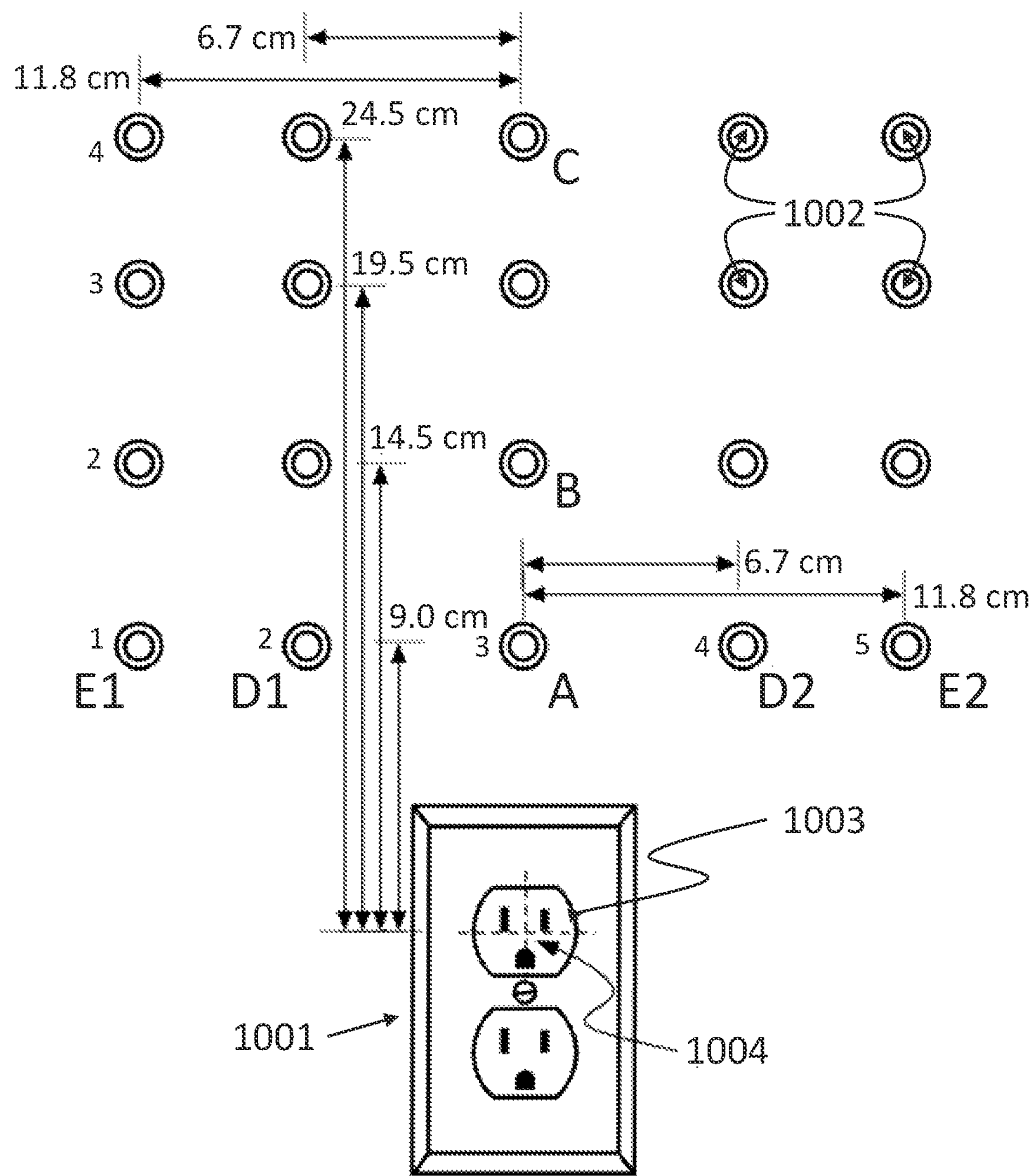
FIG. 32 depicts a drywall test stand, which a lighted plugin insect trap may be mounted on, used for the Optical Profile Method described herein.

Referring to FIG. 32, to measure the light at the drywall surface the power receptacle 1001 is mounted into the surface along the vertical centerline of the test stand approximately 40 cm from the top edge of the stand. Dependent on the design of the device, the receptacle is oriented such that, when plugged in, the device's shade is oriented upward above the receptacle. Accordingly, the receptacle may need to be mounted, for example, 90 or 180 degrees from its typical installation orientation shown in 1001 to accomplish the upward position.

Above the receptacle a grid of apertures 1002 is drilled through the drywall. A Nylon flanged bushing (from McMaster-Carr or other convenient source) is inserted into each aperture and recessed such that the flange is flush with the surface of the drywall. The wall surfaces of the bushings are also painted to match the drywall. The inside diameter of the aperture/bushing is chosen so that the spectrophotometer probe can fit snuggly and be positioned flush at the drywall surface for measurements. The aperture grid is laid out with respect to the top plug 1003 of the receptacle. The origin 1004 is located at the vertical and horizontal center of the plug 1003. The four rows of the grid are centered vertically 9.0 cm, 14.5 cm, 19.5 cm and 24.5 cm respectively, above the origin 1004. The center column of the grid is aligned vertically centered above the origin 1004. The other columns are centered 6.7 cm and 11.8 cm to the right and left respectively of the center column.

Referring to FIG. 33*a* and FIG. 33*b*, to measure the light radiating outward from the wall and device, a second power receptacle 1010 is mounted in like fashion to receptacle 1001 positioned along the vertical centerline of the test stand approximately 40 cm lower than the bottom edge of the receptacle 1001. The radial arm 1011 is an 180° arc with an inner diameter of 30.5 cm and an outer diameter of 35.6 cm and a thickness of 1.9 cm. The radial arm is painted flat black so that it does not reflect light. The terminal ends of the arc (at 0° and 180°) are rounded and a 1.27 cm cylindrical axle 1012 extends outward 2.54 cm from the arm. The origin 1013 of plug 1014 is determined in like fashion to origin 1004. The two axles 1012 are aligned horizontally with the plug's origin 1013 and attached to the drywall with two pipe straps 1015. The arm should be able to smoothly rotate 180° around the axle. Nylon tubes 1016, 2 cm long by 2 mm wall thickness, with an inside diameter appropriate to snuggly hold the spectrophotometer's probe, are used to fasten the probe to the radial arm 1011. With the radial arm rotated upward, flat against the drywall, the tubes are mounted on the arm's surface flush with the inner radius of the arm and 10° apart. Each tube is oriented toward the origin 1013 on the plug.

Figure 33C:
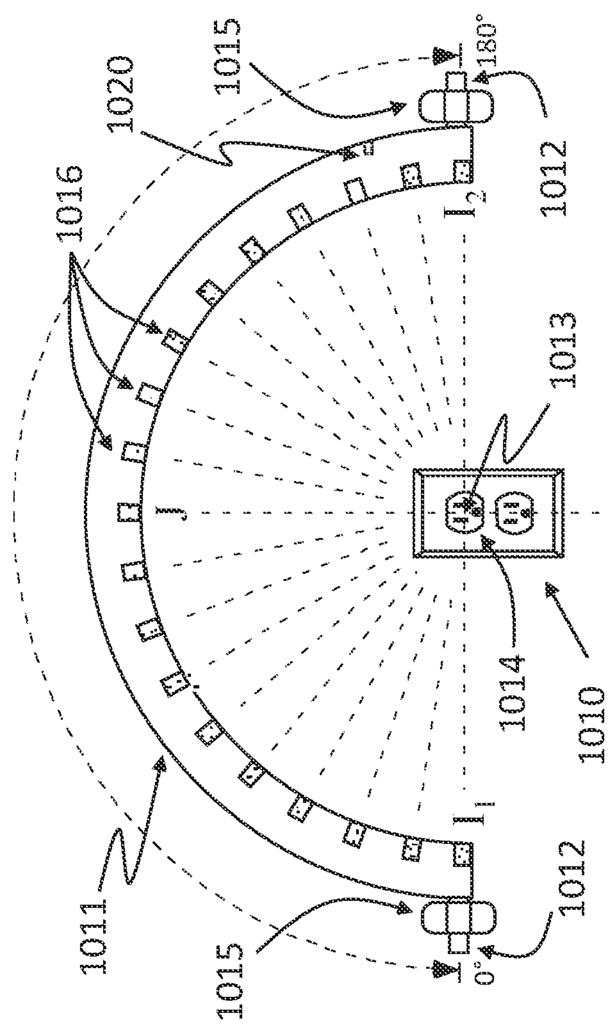
FIG. 33C depicts a radial arm that is attached to a drywall test stand, where the arm is at 50° (in a right-side profile view)
Figure 33C:
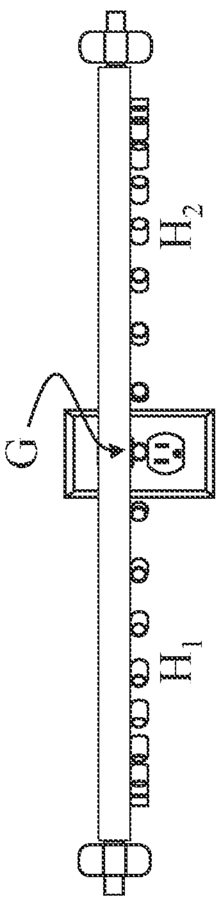
Figure 33C:
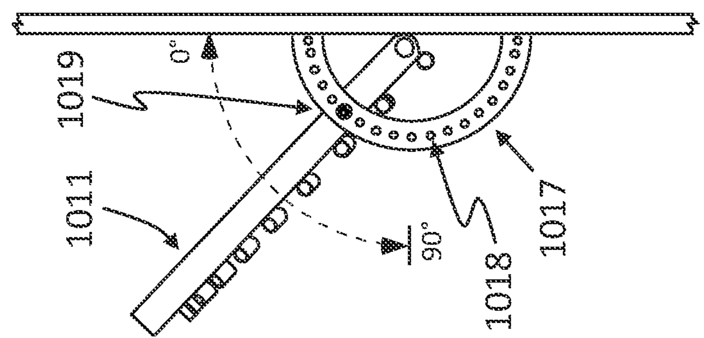

Referring to FIG. 33*c*, the radial arm is locked into position using a brace 1017 that is mounted vertically and perpendicular to the wall. The brace is an 180° arc made of aluminum with an inner radius of 8.5 cm, an outer radius of 11.0 cm, by 1.27 cm thick. Nineteen 0.7 cm through-holes 1018 are drilled in the brace 10° apart. A 0.63 cm cylindrical pin 2019 is inserted through a hole 1018 into a corresponding 0.7 cm receiving hole 1020 that is drilled into the radial arm 1011.

Instrument Set Up

The spectrophotometer, optical cable, and cosine corrector are assembled as per the instructions of the vendor(s). The computer controller is connected and absolute irradiance intensity is calibrated using the calibrated light source per the instructions of the vendor(s). For acquisition, the spectrophotometer is set to scan wavelengths from 350 nm to 750 nm. Intensity data is collected at 1 nm resolution.

The overall intensity (i.e., sum of all intensities over specified range) and maximum intensity (i.e., maximum intensity within specified range) are calculated for each of the following wavelength brackets:

Total=350 nm to 750 nm

UVA=350 nm to 400 nm

VIS=400 nm to 750 nm

Blue=450 nm to 485 nm

Part A: Measurements at Wall

Measurements are taken at different locations within the grid shown in FIG. 32 by inserting the spectrophotometer probe into the aperture such that the measurement end of the probe is positioned flush with the wall. The grid is indexed by x,y coordinates originating at the bottom left as [1,1]. When measurements are desired not along the vertical axis of the device, paired measurements are made equidistant to the left and right of the device and averaged before reporting.

For example, a spectrum is collected sequentially at positions [3,1] A, [3,2] B, [3,4] C, [1,2] D1, [1,4] D2, [1,1] E1, and [1,5] E2. For each spectrum, the sum of intensities is calculated and the maximum intensity within each wavelength bracket is identified. For locations A, B and C, the summed intensity and the maximum intensity are individually reported as the Overall Intensity and Maximum Intensity to the nearest 1 μW/cm² for each wavelength bracket. For pairs $D_1$, $D_2$ and $E_1$, $E_2$, the paired summed intensities and the paired maximum intensities are averaged and reported as the Overall Intensity and Maximum Intensity for D and E, respectively, to the nearest 1 μW/cm² for each wavelength bracket.

Part B: Measurements Toward Wall

Measurements toward the wall are performed using the radial arm shown in FIG. 33*a* through FIG. 33*c*. The radial arm can be rotated around the device and locked in 10° increments and the probe can be positioned on the arm radially also in 10° increments to make spectral measurements around the device at locations along a hemispheric "dome". The radial arm rotated upward and resting flush against the drywall is defined as 0°. When measurements are desired not along the vertical axis of the device, paired measurements are made equidistant to the left and right of the device and averaged. Locations are indexed as [angle of arm, angle of probe along arm] coordinates.

For example, a spectrum is collected at locations G [90,90], and J [0,90] and the pairs $H_1$ [90,50], $H_2$ [90,100] and $I_1$ [0,0], 12 [0,180]. For each spectrum, the sum of intensities is calculated and the maximum intensity within each wavelength bracket is identified. For locations G and J, the summed intensity and the maximum intensity are individually reported as the Overall Intensity and Maximum Intensity to the nearest 1 μW/cm² for each wavelength bracket. For pairs H1, H2 and I1, I2, the paired summed intensities and the paired maximum intensities are averaged and reported as the Overall Intensity and Maximum Intensity for H and I, respectively, to the nearest 1 μW/cm² for each wavelength bracket.

Part C: Measurement at the Device

Measurement at the device is performed last, as it is destructive to the device. The radial arm is rotated up out of the way to the 0° position. Using a scalpel or drill, a circular hole the diameter of the spectral probe is cut at the longitudinal and horizontal midpoint of the device's shade and insert, completely through the shade and insert, such that the light can radiate out. The spectral probe is inserted into the circular hole, through the shade and insert, such that the measurement end of the probe is positioned at the light source-facing surface of the insert and facing the wall, and acquires a scan. For this location, referred to as F (not shown), the sum of intensities is calculated and the maximum intensity is identified within each wavelength bracket. For location F, the summed intensity and the maximum intensity are individually reported as Overall Intensity and Maximum Intensity to the nearest 1 μW/cm² for each wavelength bracket.

EXAMPLES

The Optical Profile Method is used to measure the absolute light intensity across the optical spectrum of lighted plugin insect traps mounted on a drywall test stand. The traps that are tested are the DynaTrap® DOT, the DynaTrap® DT3009 Flylight, a trap having a flat configuration, two different traps having curved configurations, where the two traps have blue LED lights of different intensities.

Light intensity is measured at locations A, C, D, E, F, J, H, I, and G as described above and shown in FIGS. 32 and 33*a*, 33*b*, and 33*c*. The measured light intensities at locations D1 and D2 are the same and reported as location D in Table 1, for all the traps tested. The light intensities at locations I1 and I2 are the same and reported as location I in Table 1, for all the traps tested.

TABLE 1

Light Intensity at Specified Wavelengths and Locations

| Location | Light Wavelength | Units | DYNATRAP ® DOT Trap | DYNATRAP ® DT3009 Flylight Trap | Flat Trap[1] | Curved A Trap[2] | Curved B Trap[3] | Curved C Trap[4] |
|---|---|---|---|---|---|---|---|---|
| A | Blue | μW/cm² | 167 | 93 | 4,033 | 7,144 | 18,648 | 459 |
| | UVA | μW/cm² | 61 | 19 | 29 | 42 | 93 | 26 |
| | Blue/UVA | none | 3 | 5 | 137 | 172 | 200 | 18 |
| B | Blue | μW/cm² | 15 | 84 | 1,273 | 2,457 | 6,526 | 154 |
| | UVA | μW/cm² | 6 | 15 | 14 | 22 | 42 | 3 |
| | Blue/UVA | none | 3 | 5 | 90 | 113 | 157 | 205 |
| D | Blue | μW/cm² | 67 | 34 | 1,303 | 1,340 | 3,558 | 93 |
| | UVA | μW/cm² | 395 | 33 | 30 | 22 | 24 | 20 |
| | Blue/UVA | none | 0.2 | 1.0 | 44 | 60 | 150 | 4.7 |
| F | Blue | μW/cm² | 25 | 0* | 19,390 | 20,732 | 27,966 | 980 |
| | UVA | μW/cm² | 4 | 0* | 428 | 420 | 333 | 61 |
| | Blue/UVA | none | 6 | —** | 45 | 49 | 84 | 16 |
| J | Blue | μW/cm² | 9 | 30 | 355 | 509 | 1,637 | 49 |
| | UVA | μW/cm² | 9 | 31 | 22 | 24 | 113 | 7 |
| | Blue/UVA | none | 1 | 1 | 16 | 21 | 14 | 7 |
| I | Blue | μW/cm² | 18 | 7,144 | 108 | 52 | 84 | 8 |
| | UVA | μW/cm² | 124 | 42 | 20 | 18 | 0* | 56 |
| | Blue/UVA | none | 0.1 | 170 | 5 | 3 | —** | 0.14 |
| G | Blue | μW/cm² | 4 | 26 | 76 | 64 | 114 | 4 |
| | UVA | μW/cm² | 4 | 2 | 3 | 7 | 0* | 0* |
| | Blue/UVA | none | 0.9 | 12 | 31 | 10 | —** | —** |

*Intensity too low to be measured using the Optical Profile Method described herein.

**Ratio not calculated if blue intensity, UVA intensity, or both are zero.

Figure 34:
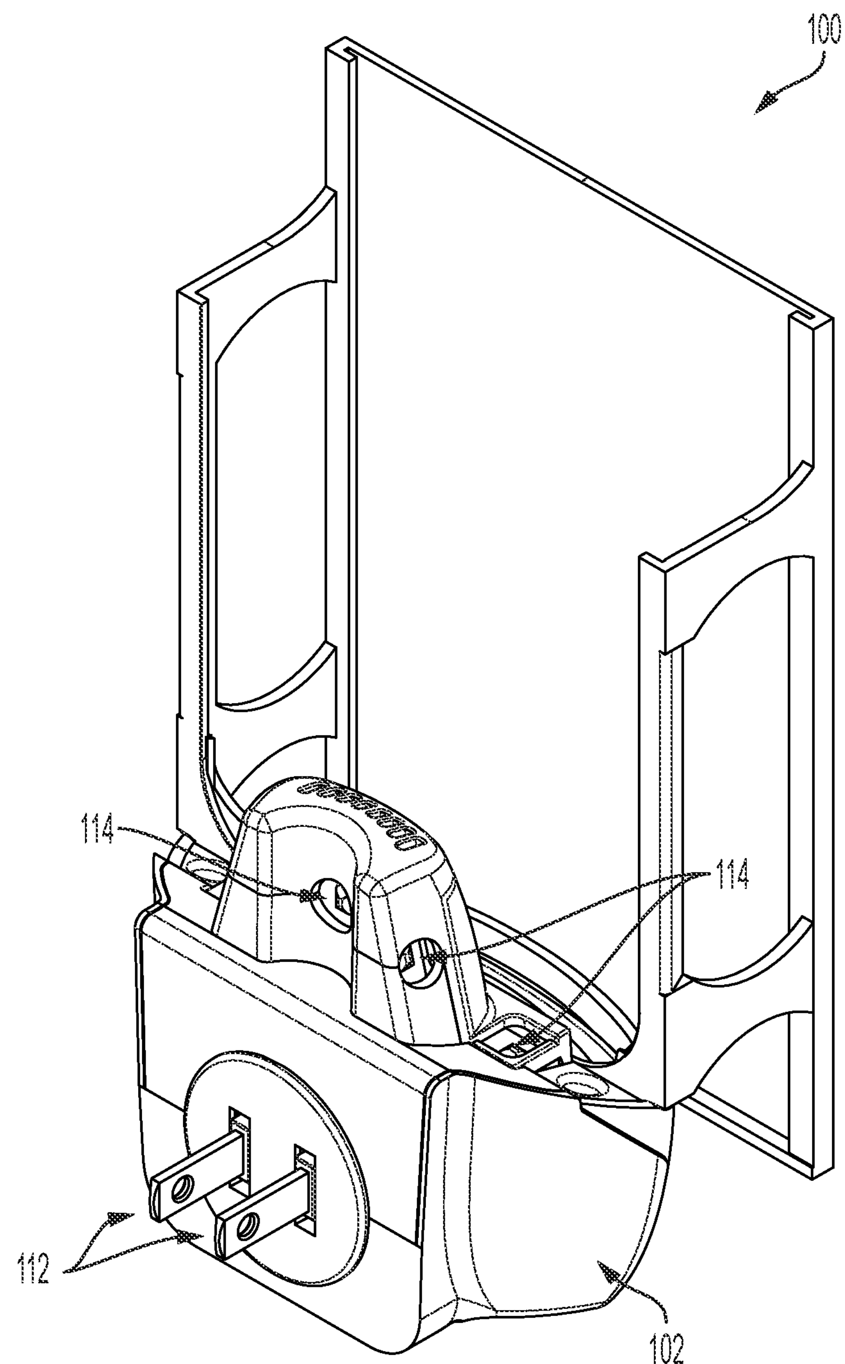
FIG. 34 is a rear, left-side isometric view of a comparative arthropod trapping device, without an insert.

[1]Flat trap is the trap of FIG. 34.

Figure 1:
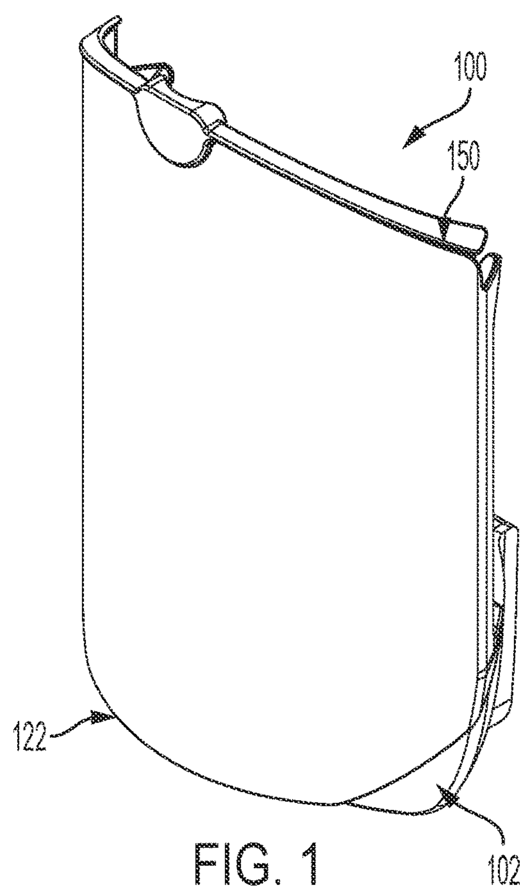
FIG. 1 is a front, right-side isometric view of an example arthropod trapping device in accordance with the present disclosure.

[2]Curved A trap is the trap of FIG. 1.

[3]Curved B trap is the trap of FIG. 1 but having different light intensity(ies) than the Curved A trap (due to the use of different LEDs).

Figure 31:
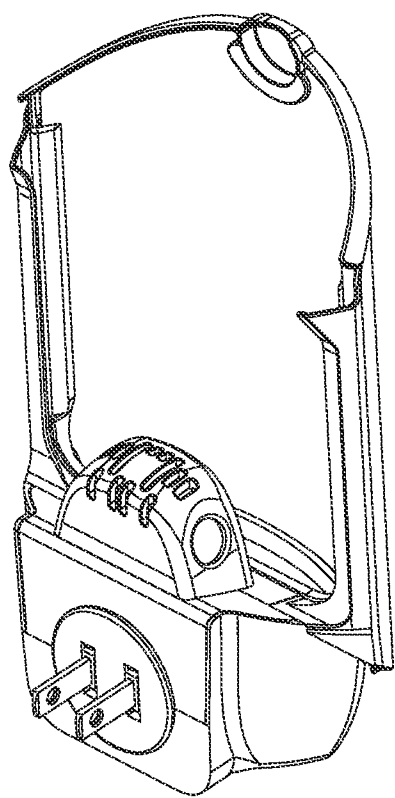
FIG. 31 is a rear, left-side isometric view of another example arthropod trapping device in accordance with the present disclosure.

[4]Curved C trap is the trap of FIG. 31.

TABLE 2

Ratio of Light Intensities at Specified Locations

| Location | Light | Units | DYNATRAP ® DOT Trap | DYNATRAP ® DT3009 Flylight Trap | Flat Trap[1] | Curved A Trap[2] | Curved B Trap[3] | Curved C Trap[4] |
|---|---|---|---|---|---|---|---|---|
| B/D | Blue | none | 0.2 | 2.5 | 1.0 | 1.8 | 1.8 | 1.7 |
| | UVA | none | —** | 0.5 | 0.5 | 1.0 | 1.8 | 0.2 |
| A/D | Blue | none | 2.5 | 2.7 | 3.1 | 5.3 | 5.2 | 4.9 |
| | UVA | none | 0.2 | 0.6 | 1.0 | 1.9 | 3.9 | 1.3 |
| A/B | Blue | none | 11 | 1.1 | 3.2 | 2.9 | 2.9 | 3.0 |
| | UVA | none | 11 | 1.2 | 2.1 | 1.9 | 2.2 | 8.7 |
| B/G | Blue | none | 4 | 3 | 17 | 38 | 57 | 38.5 |
| | UVA | none | 1 | 7 | 6 | 3 | 99 | —** |
| F/A | Blue | none | 0.1 | —** | 5 | 3 | 1 | 2.1 |
| | UVA | none | 0.1 | —** | 15 | 10 | 4 | 2.3 |
| J/I | Blue | none | 0.5 | —** | 3.3 | 9.8 | 19.5 | 6.1 |
| | UVA | none | 0.1 | 0.7 | 1.1 | 1.4 | —** | 0.1 |

**Ratio not calculated if Blue, UVA, or both are zero.

[1]Flat trap is the trap of FIG. 34.

[2]Curved A trap is the trap of FIG. 1.

[3]Curved B trap is the trap of FIG. 1 but having different light intensity(ies) than the Curved A trap (due to the use of different LEDs).

[4]Curved C trap is the trap of FIG. 31.

It is believed that an arthropod trap having a light source and an opaque shade, where the light source and the shade are configured such that light is cast onto the shade as well as a wall behind the trap, when the trap is plugged into a wall socket, will better attract arthropods.

More specifically, it may be desirable that the light intensity is greatest at location F (the longitudinal and horizontal midpoint of the shade), for blue light, UV light, or both. Without being bound by theory, this may ensure that arthropods that are drawn near the trap will be most attracted to location F—which represents the light source/LED-facing surface of the insert, where an adhesive for trapping the arthropod is disposed. The intensity of blue light at location F may be from about 50 μW/cm$^2$ to about 30,000 μW/cm$^2$, or from about 100 μW/cm$^2$ to about 20,000 μW/cm$^2$, or from about 500 μW/cm$^2$ to about 5,000 μW/cm$^2$. The intensity of UV light at location F may be from about 10 μW/cm$^2$ to about 450 μW/cm$^2$, or from about 20 μW/cm$^2$ to about 100 μW/cm$^2$. The ratio of blue light intensity to UV light intensity at location F may be from about 10 to about 100 or from about 15 to about 50.

It may be desirable that the light intensity at location A is less than the light intensity at location F, but greater than the light intensity at the other locations, for blue light, UV light, or both. Without being bound by theory, having increased light intensity at location A, which represents the wall directly behind the trap shade, when the trap is plugged into a wall socket, may help to attract arthropods from farther away. Also, light cast on the wall directly behind the shade may be less intrusive for users, as the shade blocks some of the light. The intensity of blue light at location A may be from about 200 μW/cm$^2$ to about 20,000 μW/cm$^2$, or from about 300 μW/cm$^2$ to about 10,000 μW/cm$^2$, or from about 350 μW/cm$^2$ to about 8,000 μW/cm$^2$. The intensity of UV light at location A may be from about 20 μW/cm$^2$ to about 55 μW/cm$^2$, or from about 25 μW/cm$^2$ to about 50 μW/cm$^2$. The ratio of blue light intensity to UV light intensity at location A may be from about 7 to about 200 or from about 10 to about 200.

It may be desirable that the blue light intensity at location B as well as location D is less than the blue light intensity at location A and location F. Light measured at locations B and D represents the light halo cast by the trap on the wall, when the trap is plugged into a wall socket. At locations B and D, the light intensity is preferably sufficient to attract arthropods to the trap but not so great that it is intrusive for users. The intensity of blue light at Location B may be from about 100 μW/cm$^2$ to about 6,500 μW/cm$^2$, or from about 125 μW/cm$^2$ to about 3,000 μW/cm$^2$. The intensity of blue light at Location D may be from about 70 μW/cm$^2$ to about 3,500 μW/cm$^2$, or from about 80 μW/cm$^2$ to about 1,500 μW/cm$^2$. The ratio of blue light intensity at location B to blue light intensity at location D may be from about 0.25 to about 2.25, or from about 0.5 to about 2. The ratio of blue light intensity at location B to blue light intensity at location D may be from about 1.1 to about 2 and may represent an asymmetric halo on the wall. An asymmetric halo, with greater light intensity on the wall above the trap, may better attract flying arthropods that approach the trap from above, while still being less intrusive and/or noticeable to the user.

The ratio of blue light intensity at location A to blue light intensity at location D may be from about 3 to about 10 or from about 4 to about 7. The ratio of UV light intensity at location A to UV light intensity at location D may be from about 0.75 to about 5, or from about 1 to about 2. The ratio of blue light intensity at location A to blue light intensity at location B may be from about 1.5 to about 10 or from about 2 to about 5. The ratio of UV light intensity at location A to UV light intensity at location B may be from about 1.5 to about 10, or from about 2 to about 9.

Light at locations I, J and G represents light escaping from the trap and may be visible to users, arthropods, or both. It may be desirable to limit the intensity of light escaping form the trap, in order to make the trap less intrusive and noticeable to users, while still providing sufficient light intensity (blue light, UV light, or both) to attract arthropods. The intensity of blue light at location I may be from about 3 μW/cm$^2$ to about 80 μW/cm$^2$, or about 3 μW/cm$^2$ to about 15 μW/cm$^2$, or about 25 μW/cm$^2$ to about 80 μW/cm$^2$. The intensity of UV light at location I may be from about 2 μW/cm$^2$ to about 100 μW/cm$^2$, or from about 2 μW/cm$^2$ to about 40 μW/cm$^2$, or from about 45 μW/cm$^2$ to about 100 μW/cm$^2$.

The intensity of blue light at Location J may be from about 40 μW/cm$^2$ to about 1,500 μW/cm$^2$, or from about 50 μW/cm$^2$ to about 500 μW/cm$^2$. The intensity of UV light at Location J may be from about 3 μW/cm$^2$ to about 25 μW/cm$^2$, or from about 15 μW/cm$^2$ to about 25 μW/cm$^2$, or from about 3 μW/$cm^2$ to about 8 μW/$cm^2$. The ratio of blue light intensity to UV light intensity at Location J may be from about 2 to about 25 or from about 5 to about 21.

The intensity of blue light at Location G may be from about 3 μW/$cm^2$ to about 100 μW/$cm^2$, or from about 4 μW/$cm^2$ to about 60 μW/$cm^2$. The intensity of UV light at Location G may be less than about 35 μW/$cm^2$ or less than about 10 μW/$cm^2$.

The intensity of light exiting the top of the trap may be greater than the intensity of light exiting the sides of the trap. Arthropods, especially flying arthropods, may approach the trap from above and it may be advantageous to have more light exiting the top of the trap than the sides of the trap. The ratio of blue light intensity at location J to blue light intensity at location I may be from about 1 to about 15 or from about 2 to about 12. The ratio of UV light intensity at location J to UV light intensity at location I may be from about 0.1 to about 2.

The intensity of blue light on the wall above the trap, as represented by light measured at location B, may be greater than the intensity of blue light exiting the trap, as represented by light measured at location G. Though light exiting the trap, as represented by light measured at location G, may help draw arthropods to the trap, it is believed that having greater light intensity on the wall, as represented by light measured at location B, may help draw arthropods nearer to the adhesive disposed on the light source/LED-facing surface of the trap insert. The ratio of blue light intensity at Location B to blue light intensity at location G may be from about 5 to about 55.

Similarly, the intensity of light on the light source/LED-facing surface of the trap insert (which has adhesive disposed thereon), as represented by light measured at location F, may be greater than the intensity of light on the wall directly behind the trap, as represented by light measured at location A. This may ensure that arthropods drawn near the trap are most attracted to the adhesive surface, where they will be immobilized. The ratio of blue light intensity at Location F to blue light intensity at Location A may be from about 1.1 to about 10 or from about 1.5 to about 5. The ratio of UV light intensity at location F to UV light intensity at Location A may be from about 1.1 to about 15 or from about 1.5 to about 10.

Combinations

A. An insert comprising a) a substrate and a frame for supporting the substrate, wherein a surface of the substrate has an adhesive disposed thereon, and b) a graspable tab extending from the frame at a second end of the insert, wherein the insert is configured for insertion into an arthropod trapping device, the adhesive is for trapping the arthropod, and wherein the graspable tab is substantially free of adhesive.

B. An insert comprising a) a substrate and a frame for supporting the substrate, wherein a surface of the substrate has an adhesive disposed thereon, and b) a downwardly depending tab extending from the frame at a first end of the insert, wherein the insert is configured for insertion into an arthropod trapping device comprising a slot for receiving the downwardly depending tab and the adhesive is for trapping the arthropod.

C. The insert of paragraph A, wherein the insert further comprises a downwardly depending tab extending from the bottom edge of the frame and the arthropod trapping device comprises a slot for receiving the downwardly depending tab.

D. The insert of paragraph B, wherein the insert further comprises a graspable tab extending from the frame at a second end of the insert, preferably wherein the graspable tab is substantially free of adhesive.

E. The insert of any one of the preceding paragraphs, wherein the surface of the substrate having an adhesive disposed thereon faces an LED in the arthropod trapping device and the downwardly depending tab activates a switch in the arthropod trapping device to energize the LED, when the insert is inserted into the arthropod trapping device.

F. The insert of any one of the preceding paragraphs wherein the substrate is curved, pleated, textured, or a combination thereof, preferably the substrate is curved, more preferably the substrate is concave-convex.

G. The insert of any one of the preceding paragraphs, wherein the insert comprises a mounting bracket spaced apart from the adhesive surface of the insert and located at a first end of the insert, wherein the adhesive surface of the insert and the bracket define an opening in the insert.

H. The insert of any one of the preceding paragraphs, wherein the substrate comprises a polymeric, fibrous, or carbon-based material.

I. The insert of any one of the preceding paragraphs, wherein the substrate, the adhesive, or both are transparent or translucent.

J. The insert of any one of the preceding paragraphs, wherein the substrate, the adhesive, or both transmits greater than about 80% of blue light, preferably greater than about 90% of blue light.

K. The insert of any one of the preceding paragraphs, wherein the substrate, the adhesive, or both transmits less than about 80% of UV light, preferably less than about 50% of UV light, more preferably less than about 30% of UV light.

L. An arthropod trapping device comprising: a housing comprising a base and a shade coupled to the base, the base configured to communicate with and receive power from a power source, wherein at least one LED is mounted on the base, the shade configured to receive an insert comprising a shade-facing surface and a LED-facing surface, wherein an adhesive for trapping the arthropod is disposed on the LED-facing surface of the insert, wherein the at least one LED is configured to emit light toward the LED-facing surface of the shade, wherein the light is reflected off the shade, off of the insert, or off a combination thereof M. An arthropod trapping device comprising: a housing comprising a base and a shade coupled to the base, the base configured to communicate with and receive power from a power source, wherein at least one LED is mounted on the base, the shade configured to receive an insert comprising a shade-facing surface and an LED-facing surface, wherein an adhesive for trapping the arthropod is disposed on the LED-facing surface of the insert and the adhesive surface area is greater than or equal to the projected area of the device.

N. An arthropod trapping device comprising: a housing comprising a base and a shade coupled to the base, the base configured to communicate with and receive power from a power source, wherein at least one LED is mounted on the base, the shade configured to receive an insert comprising a shade-facing surface and a LED-facing surface, wherein an adhesive for trapping the arthropod is disposed on the LED-facing surface of the insert, wherein the shade overhangs the base and, preferably, an outward-facing wall of the base and an insert-facing surface of the shade define an opening in the housing.

O. The arthropod trapping device of any one of the preceding paragraphs, wherein at least one LED has peak wavelengths of from about 350 nm to about 500 nm.

P. The arthropod trapping device of any one of the preceding paragraphs, wherein at least one LED has a peak wavelength of from about 400 nm to about 500 nm.

Q. The arthropod trapping device of any one of the preceding paragraphs, wherein at least one LED has a peak wavelength of from about 350 nm to about 400 nm.

R. The arthropod trapping device of any one of the preceding paragraphs, wherein at least one LED has a peak wavelength of about 350 nm to about 400 nm and at least one LED has a peak wavelength of about 400 nm to about 500 nm.

S. The arthropod trapping device of any one of the preceding paragraphs, wherein at least one LED has a peak wavelength of about 400 nm to about 500 nm and emits light in a direction substantially perpendicular to the LED-facing surface of the shade.

T. The arthropod trapping device of any one of the preceding paragraphs, wherein at least one LED has a peak wavelength of about 350 nm to about 400 nm and emits light in a direction substantially parallel to the LED-facing surface of the shade.

U. The arthropod trapping device of any one of the preceding paragraphs, wherein the projected area of the device is from about 40 $cm^2$ to about 120 $cm^2$, preferably 50 $cm^2$ to about 100 $cm^2$, more preferably about 65 $cm^2$ to about 90 $cm^2$.

V. The arthropod trapping device of any one of the preceding paragraphs, wherein the surface area of the adhesive disposed on the LED-facing surface of the insert is from about 40 $cm^2$ to about 180 $cm^2$, preferably 50 $cm^2$ to about 160 $cm^2$, more preferably about 75 $cm^2$ to about 155 $cm^2$.

W. The arthropod trapping device of any one of the preceding paragraphs, wherein an adhesive for trapping the arthropod is disposed on the shade-facing surface of the insert.

X. The arthropod trap of any one of the preceding paragraphs, wherein one or more electrically conductive prongs protrude from the base, preferably the electrically conductive prongs are insertable into an electrical power outlet.

Y. The arthropod trapping device of any one of the preceding paragraphs, wherein base comprises a slot for receiving the insert.

Z. The arthropod trapping device of any one of the preceding paragraphs, wherein the insert comprises a substrate and a frame for supporting the substrate, preferably the substrate has an LED-facing surface and a shade-facing surface, more preferably the adhesive is disposed on the LED-facing surface of the substrate.

AA. The arthropod trapping device of paragraph W, wherein the substrate is curved, concave-convex, pleated, textured, or a combination thereof, preferably the substrate is concave-convex.

BB. The arthropod trap of any one of the preceding paragraphs, wherein the shade is curved, preferably the shade is concave-convex.

CC. The arthropod trap of any one of the preceding paragraphs, wherein the shade overhangs the base and, preferably, an outward-facing wall of the base and an insert-facing surface of the shade define an opening in the housing.

DD. The arthropod trap of any one of the preceding paragraphs, wherein the shade comprises a recess for receiving a graspable tab of the insert.

EE. The arthropod trap of any one of the preceding paragraphs, wherein the shade comprises at least one insert-receiving rail.

FF. The arthropod trap of paragraph BB, wherein the insert comprises a flange configured to slide into the insert-receiving groove of the shade.

GG. The arthropod trapping device of any one of the preceding paragraphs, wherein each LED has a conical angle of about 20° to about 180°.

HH. The arthropod trapping device of any one of the preceding paragraphs, wherein the base comprises a switch, a circuit board, or a combination thereof, preferably wherein the switch comprises a mechanical switch, an optical switch, an electronic switch, an electromechanical switch, or a Hall effect sensor.

II. The arthropod trapping device of paragraph EE, wherein the circuit board is configured to vary the voltage to the LEDs, preferably wherein the LEDs emits light intermittently.

JJ. A method of using the arthropod trapping device of any one of the preceding paragraphs, comprising the steps of inserting the insert into the housing and engaging the base with a power source.

KK. The method of paragraph GG, wherein the base comprises one or more electrically conductive prongs and engaging the base with a power source comprises inserting the electrically conductive prongs into an electrical power outlet.

LL. The method of paragraph GG, further comprising the step of removing the insert from the housing and disposing of the insert, preferably without contacting the adhesive or arthropod remains adhered thereto.

MM. The method of paragraph II, wherein removing the insert from the shade deactivates a switch in the base to de-energize the LEDs.

NN. The arthropod trapping device of any one of the preceding paragraphs, wherein the shade comprises a polymeric, fibrous, or carbon-based material.

OO. The arthropod trapping device of any one of the preceding paragraphs, wherein the power source comprises an electrical power outlet or a battery.

PP. The arthropod trapping device of any one of the preceding paragraphs, wherein the base comprises an energy stabilizer configured to provide a constant voltage to the LEDs, preferably the energy stabilizer comprises a full rectifier circuit.

QQ. The arthropod trapping device of any one of the preceding paragraphs, wherein the intensity, peak wavelength, frequency, and/or intermittency of the light emitted by each LED is independently adjustable.

RR. The arthropod trapping device of any one of the preceding paragraphs, wherein the insert comprises a chemical attractant.

SS. The arthropod trapping device of any one of the preceding paragraphs, wherein the shade is configured to receive an insert comprising a graspable tab, wherein the shade comprises a recess configured to receive the graspable tab of the insert.

TT. The arthropod trapping device of any one of the preceding paragraphs, wherein the shade comprises at least one guiderail, preferably the at least one guiderail comprises a flared opening.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An arthropod trapping device comprising:

a housing comprising a base, a shade coupled to the base, the shade comprising a convex outward-facing surface and a concave wall-facing surface, the base configured to receive power from a power source, wherein the base comprises a switch and electrical components coupled to a circuit board, wherein the electrical components comprise a processor and one or more LEDs, wherein the one or more LEDs comprise an LED having a peak wavelength of from about 350 nm to about 400 nm and an indicator LED, and an insert comprising a shade-facing surface and a wall-facing surface, wherein an adhesive for trapping the arthropod is disposed on the wall-facing surface of the insert, wherein the shade is configured to receive the insert, wherein the switch is configured to energize the electrical components and the circuit board when the insert is inserted into the base, wherein the indicator LED configured to change color, intensity, or flicker to alert a user that the insert is in need of replacement based on the time elapsed since insertion of the insert, wherein the base comprises an outward-facing wall, wherein a portion of the shade overlaps a portion of the outward-facing wall of the base, wherein the outward-facing wall of the base and the wall-facing surface of the shade define an opening in the housing.

2. The arthropod trapping device of claim 1, wherein the at least one LED further comprises a LED having a peak wavelength of from about 400 nm to about 600 nm.

3. The arthropod trapping device of claim 1, wherein the at least one LED further comprises a LED having a peak wavelength of about 400 nm to about 600 nm and emits light in a direction substantially perpendicular to the LED-facing surface of the shade.

4. The arthropod trapping device of claim 1, wherein a projected area of the device is from about 40 $cm^2$ to about 120 $cm^2$.

5. The arthropod trapping device of claim 1, wherein the surface area of the adhesive disposed on the wall-facing surface of the insert is from about 40 $cm^2$ to about 180 $cm^2$.

6. The arthropod trapping device of claim 1, wherein the shade comprises a recess for receiving a graspable tab of the insert.

7. The arthropod trapping device of claim 1, wherein the shade comprises at least one guiderail.

8. The arthropod trapping device of claim 7, wherein the insert comprises a flange configured to slide into the guiderail of the shade.

9. The arthropod trapping device of claim 7, wherein the shade comprises a first longitudinal side edge and a second longitudinal side edge opposite the first longitudinal side edge, wherein the shade comprises a material that extends continuously from the first longitudinal side edge to the second longitudinal side edge.

10. The arthropod trapping device of claim 9, wherein the shade is opaque.

* * * * *